(12) United States Patent
Anthony

(10) Patent No.: US 12,226,039 B2
(45) Date of Patent: Feb. 18, 2025

(54) GUARD FOR COOKING SYSTEM

(71) Applicant: SHARKNINJA OPERATING LLC, Needham, MA (US)

(72) Inventor: Joshua D. Anthony, Billerica, MA (US)

(73) Assignee: SharkNinja Operating LLC, Needham, MA (US)

(*) Notice: Subject to any disclaimer, the term of this patent is extended or adjusted under 35 U.S.C. 154(b) by 0 days.

(21) Appl. No.: 18/453,035

(22) Filed: Aug. 21, 2023

(65) Prior Publication Data

US 2023/0389742 A1 Dec. 7, 2023

Related U.S. Application Data

(62) Division of application No. 16/800,476, filed on Feb. 25, 2020, now Pat. No. 11,751,710.

(60) Provisional application No. 62/810,254, filed on Feb. 25, 2019.

(51) Int. Cl.
*F24C 15/36* (2006.01)
*A47J 27/00* (2006.01)
*A47J 36/06* (2006.01)
*A47J 37/06* (2006.01)
*F24C 15/32* (2006.01)

(52) U.S. Cl.
CPC ............ *A47J 27/002* (2013.01); *A47J 36/06* (2013.01); *A47J 37/0641* (2013.01); *A47J 37/0664* (2013.01); *F24C 15/322* (2013.01); *F24C 15/36* (2013.01)

(58) Field of Classification Search
None
See application file for complete search history.

(56) References Cited

U.S. PATENT DOCUMENTS

| 472,002 | A | 3/1892 | Ross et al. |
| 1,254,384 | A | 1/1918 | Albro |
| 1,986,088 | A | 1/1935 | Wild |
| 2,055,972 | A | 9/1936 | John |

(Continued)

FOREIGN PATENT DOCUMENTS

| CN | 1139304 A | 1/1997 |
| CN | 2253170 Y | 4/1997 |

(Continued)

OTHER PUBLICATIONS

WO 2015/062197 A1 (Lai, Banlai) May 7, 2015 [retrieved on Jul. 13, 2024]. Retrieved from Foreign Image and Text database, translation by Clarivate Analytics. (Year: 2015).*

(Continued)

*Primary Examiner* — John J Norton
(74) *Attorney, Agent, or Firm* — Mintz, Levin, Cohn, Ferris, Glovsky and Popeo, P.C.

(57) ABSTRACT

A cooking system including a housing having a hollow interior, a heating element associated with said housing, a support body for supporting the food within said hollow interior such that the food is positionable on a support surface of said support body, and a guard located between at least a portion of the support surface and said heating element. The guard is permissive of convective airflow between said hollow interior and said heating element, and is generally impermeable to projectile matter generated during a cooking operation.

9 Claims, 6 Drawing Sheets

(56) References Cited

U.S. PATENT DOCUMENTS

| | | |
|---|---|---|
| 2,188,757 A | 1/1940 | Moon |
| 2,235,911 A | 3/1941 | Wilcox |
| 2,253,833 A | 8/1941 | Herbert |
| 2,313,968 A | 3/1943 | Ernest |
| 2,378,950 A | 6/1945 | Ernest |
| 2,429,282 A | 10/1947 | Ness |
| 2,430,582 A | 11/1947 | Ernest |
| 2,462,287 A | 2/1949 | Richeson et al. |
| 2,532,639 A | 12/1950 | Payne |
| 2,609,960 A | 9/1952 | Irwin |
| 2,622,591 A | 12/1952 | Bramberry, Jr. |
| 2,643,024 A | 6/1953 | Cronheim |
| 2,952,764 A | 9/1960 | Yoshitada |
| 3,076,405 A | 2/1963 | Lang |
| 3,122,134 A | 2/1964 | Reeves |
| 3,514,301 A | 5/1970 | Berger |
| 3,529,582 A | 9/1970 | Hurko et al. |
| 3,610,885 A | 10/1971 | Zingg |
| 3,797,693 A | 3/1974 | Baker |
| 3,807,596 A | 4/1974 | Baker |
| 3,821,454 A | 6/1974 | Lobel |
| 3,828,760 A | 8/1974 | Farber et al. |
| 4,071,739 A | 1/1978 | Jenn et al. |
| 4,091,956 A | 5/1978 | Vecchio |
| 4,106,486 A | 8/1978 | Lee |
| 4,148,250 A | 4/1979 | Miki et al. |
| 4,162,741 A | 7/1979 | Walker et al. |
| 4,210,072 A | 7/1980 | Pedrini |
| 4,241,288 A | 12/1980 | Aoshima et al. |
| 4,268,741 A | 5/1981 | O'Brien |
| 4,313,051 A | 1/1982 | Aoshima |
| 4,315,138 A | 2/1982 | Miwa |
| 4,374,318 A | 2/1983 | Gilliom |
| 4,374,319 A | 2/1983 | Guibert |
| 4,410,030 A | 10/1983 | Skala |
| 4,430,557 A | 2/1984 | Eichelberger et al. |
| 4,482,077 A | 11/1984 | Henderson |
| 4,484,063 A | 11/1984 | Whittenburg et al. |
| 4,509,412 A | 4/1985 | Whittenburg et al. |
| 4,528,975 A | 7/1985 | Wang |
| 4,591,698 A | 5/1986 | Chang |
| 4,622,231 A | 11/1986 | Swartley |
| 4,625,097 A | 11/1986 | Miwa |
| 4,670,282 A | 6/1987 | Onishi et al. |
| 4,728,762 A | 3/1988 | Roth et al. |
| 4,771,162 A | 9/1988 | Schatz et al. |
| 4,829,158 A | 5/1989 | Burnham |
| 4,848,217 A | 7/1989 | Koziol |
| 4,889,972 A | 12/1989 | Chang |
| 4,995,313 A | 2/1991 | Delau et al. |
| 5,000,085 A | 3/1991 | Archer |
| 5,012,071 A | 4/1991 | Henke |
| 5,029,519 A | 7/1991 | Boyen |
| 5,031,519 A | 7/1991 | Toida et al. |
| 5,036,179 A | 7/1991 | Westerberg et al. |
| 5,048,400 A | 9/1991 | Ueda et al. |
| 5,067,396 A | 11/1991 | Sorensen et al. |
| 5,092,229 A | 3/1992 | Chen |
| 5,105,725 A | 4/1992 | Haglund |
| 5,205,274 A | 4/1993 | Smith et al. |
| 5,251,542 A | 10/1993 | Itoh et al. |
| 5,280,749 A | 1/1994 | Smit |
| 5,329,919 A | 7/1994 | Chang |
| 5,355,777 A | 10/1994 | Chen et al. |
| 5,416,950 A | 5/1995 | Dornbush et al. |
| 5,445,061 A | 8/1995 | Barradas |
| 5,466,912 A | 11/1995 | Dornbush et al. |
| 5,485,780 A | 1/1996 | Koether et al. |
| 5,513,558 A | 5/1996 | Erickson et al. |
| 5,526,734 A | 6/1996 | Harrison |
| 5,549,039 A | 8/1996 | Ito et al. |
| 5,567,458 A | 10/1996 | Wu |
| 5,588,352 A | 12/1996 | Harrison |
| 5,590,583 A | 1/1997 | Harrison |
| 5,615,607 A | 4/1997 | Delaquis et al. |
| 5,619,983 A | 4/1997 | Smith |
| 5,632,403 A | 5/1997 | Deng |
| 5,649,476 A | 7/1997 | Montagnino et al. |
| 5,676,044 A | 10/1997 | Lara, Jr. |
| 5,699,722 A | 12/1997 | Erickson et al. |
| 5,740,721 A | 4/1998 | Bizard et al. |
| 5,768,976 A | 6/1998 | Suk |
| 5,839,357 A | 11/1998 | Ha et al. |
| 5,896,808 A | 4/1999 | Graur |
| 5,932,130 A | 8/1999 | Taino |
| 5,967,021 A | 10/1999 | Yung |
| 5,970,858 A | 10/1999 | Boehm et al. |
| 6,006,939 A | 12/1999 | Wai |
| 6,014,986 A | 1/2000 | Baumgarten |
| 6,016,797 A | 1/2000 | Nowicke, Jr. |
| 6,019,029 A | 2/2000 | Chan |
| 6,023,050 A | 2/2000 | Violi |
| 6,060,698 A | 5/2000 | Petrides et al. |
| 6,066,837 A | 5/2000 | Mccormick et al. |
| 6,067,896 A | 5/2000 | Elorza |
| 6,070,518 A | 6/2000 | Kao |
| 6,082,249 A | 7/2000 | Su |
| 6,083,543 A | 7/2000 | Kim et al. |
| 6,097,016 A | 8/2000 | Hirata et al. |
| 6,104,004 A | 8/2000 | Ragland et al. |
| 6,105,808 A | 8/2000 | Mendonca |
| 6,116,151 A | 9/2000 | Fickert et al. |
| 6,125,737 A | 10/2000 | Chang |
| 6,135,012 A | 10/2000 | Kao |
| 6,135,013 A | 10/2000 | Barrena |
| 6,158,606 A | 12/2000 | Oliver |
| 6,173,643 B1 | 1/2001 | Qian et al. |
| 6,178,876 B1 | 1/2001 | Kao |
| 6,191,393 B1 | 2/2001 | Park |
| 6,201,217 B1 | 3/2001 | Moon et al. |
| 6,242,025 B1 | 6/2001 | Lesky et al. |
| 6,252,206 B1 | 6/2001 | Leukhardt, III et al. |
| 6,255,630 B1 | 7/2001 | Barnes et al. |
| 6,257,124 B1 | 7/2001 | Chen |
| 6,262,396 B1 | 7/2001 | Witt et al. |
| 6,267,046 B1 | 7/2001 | Wanat |
| 6,268,592 B1 | 7/2001 | Hu et al. |
| 6,269,737 B1 | 8/2001 | Rigney et al. |
| 6,271,504 B1 | 8/2001 | Barritt |
| 6,283,014 B1 | 9/2001 | Ng et al. |
| 6,283,015 B1 | 9/2001 | Kwon et al. |
| 6,320,166 B1 | 11/2001 | Park |
| 6,355,914 B1 | 3/2002 | Stockley |
| 6,384,381 B2 | 5/2002 | Witt et al. |
| 6,393,969 B1 | 5/2002 | Kim |
| D458,078 S | 6/2002 | Lin |
| 6,399,925 B1 | 6/2002 | Pickering et al. |
| 6,414,254 B1 | 7/2002 | Mcnair |
| 6,425,320 B1 | 7/2002 | Chameroy et al. |
| 6,450,085 B1 | 9/2002 | Riesselmann |
| 6,450,361 B1 | 9/2002 | Mendelson et al. |
| 6,455,085 B1 | 9/2002 | Duta |
| 6,467,645 B2 | 10/2002 | Park |
| 6,486,453 B1 | 11/2002 | Bales et al. |
| 6,494,337 B1 | 12/2002 | Moroni |
| 6,505,545 B2 | 1/2003 | Kennedy et al. |
| 6,509,550 B1 | 1/2003 | Li |
| 6,513,420 B1 | 2/2003 | Park |
| 6,523,459 B1 | 2/2003 | Chameroy et al. |
| 6,528,772 B1 | 3/2003 | Graves et al. |
| 6,540,097 B1 | 4/2003 | Beck et al. |
| 6,545,252 B2 | 4/2003 | Wang |
| 6,552,309 B1 | 4/2003 | Kish et al. |
| 6,559,427 B1 | 5/2003 | Barnes et al. |
| 6,565,903 B2 | 5/2003 | Ng et al. |
| 6,568,314 B1 | 5/2003 | Stepanova |
| 6,573,483 B1 | 6/2003 | Decobert et al. |
| 6,602,530 B1 | 8/2003 | Weber et al. |
| 6,603,099 B2 | 8/2003 | Gouthiere |
| 6,604,453 B2 | 8/2003 | Niese |
| 6,615,706 B1 | 9/2003 | Wu |
| 6,615,708 B1 | 9/2003 | Lin |
| 6,617,554 B2 | 9/2003 | Moon et al. |
| 6,631,824 B2 | 10/2003 | Park |

(56) References Cited

U.S. PATENT DOCUMENTS

| | | |
|---|---|---|
| 6,648,162 B1 | 11/2003 | Wooderson et al. |
| 6,657,167 B2 | 12/2003 | Loveless |
| 6,669,047 B2 | 12/2003 | Wooderson et al. |
| 6,695,319 B1 | 2/2004 | Anota et al. |
| D487,212 S | 3/2004 | Park |
| 6,698,337 B1 | 3/2004 | Park |
| 6,703,061 B2 | 3/2004 | Kennedy et al. |
| 6,705,209 B2 | 3/2004 | Yang et al. |
| 6,723,963 B2 | 4/2004 | Ronda |
| 6,730,881 B1 | 5/2004 | Arntz et al. |
| 6,730,882 B2 | 5/2004 | Atkinson |
| 6,730,889 B1 | 5/2004 | Jones-Lawlor |
| 6,736,131 B2 | 5/2004 | Yamamoto et al. |
| 6,740,855 B1 | 5/2004 | Decobert et al. |
| 6,742,445 B2 | 6/2004 | Backus et al. |
| 6,747,250 B1 | 6/2004 | Cha |
| 6,755,319 B2 | 6/2004 | Park |
| 6,758,132 B1 | 7/2004 | Kuo et al. |
| 6,777,651 B1 | 8/2004 | Boyer |
| 6,782,805 B2 | 8/2004 | Backus et al. |
| 6,782,806 B2 | 8/2004 | Backus et al. |
| 6,802,429 B1 | 10/2004 | Wildman |
| 6,809,297 B2 | 10/2004 | Moon et al. |
| 6,812,433 B1 | 11/2004 | Barritt |
| 6,815,644 B1 | 11/2004 | Muegge et al. |
| 6,831,254 B2 | 12/2004 | Barritt |
| 6,833,534 B2 | 12/2004 | Bellassai et al. |
| 6,837,150 B2 | 1/2005 | Backus et al. |
| 6,841,762 B2 | 1/2005 | Suzuki |
| 6,845,707 B1 | 1/2005 | Xu et al. |
| 6,846,504 B1 | 1/2005 | Yarnell |
| 6,851,351 B2 | 2/2005 | Payen et al. |
| 6,872,921 B1 | 3/2005 | Decobert et al. |
| 6,874,408 B2 | 4/2005 | Backus et al. |
| 6,877,633 B2 | 4/2005 | Niese |
| 6,903,310 B1 | 6/2005 | Lee et al. |
| 6,917,017 B2 | 7/2005 | Moon et al. |
| 6,930,286 B2 | 8/2005 | Kim |
| 6,933,477 B2 | 8/2005 | Becker et al. |
| 6,935,223 B2 | 8/2005 | Kobayashi |
| 6,936,795 B1 | 8/2005 | Moon et al. |
| 6,936,801 B1 | 8/2005 | Head |
| 6,941,857 B2 | 9/2005 | Mclemore |
| 6,972,397 B2 | 12/2005 | Ha |
| 7,009,147 B1 | 3/2006 | Schulte |
| 7,012,220 B2 | 3/2006 | Boyer et al. |
| 7,012,221 B2 | 3/2006 | Li |
| 7,021,203 B2 | 4/2006 | Backus et al. |
| 7,021,204 B2 | 4/2006 | Backus et al. |
| 7,024,104 B2 | 4/2006 | Moore, Jr. et al. |
| 7,045,745 B2 | 5/2006 | Kim |
| 7,053,337 B2 | 5/2006 | Ragan et al. |
| 7,060,941 B1 | 6/2006 | Embury et al. |
| 7,060,943 B2 | 6/2006 | Hwang |
| 7,081,601 B2 | 7/2006 | Boyer et al. |
| 7,082,871 B2 | 8/2006 | Schultz |
| 7,086,326 B2 | 8/2006 | Yokoyama |
| 7,087,873 B2 | 8/2006 | Hayakawa et al. |
| 7,091,454 B2 | 8/2006 | Cho et al. |
| 7,105,780 B2 | 9/2006 | De'Longhi |
| 7,126,088 B2 | 10/2006 | Horton et al. |
| 7,148,451 B2 | 12/2006 | Miyake et al. |
| 7,154,069 B1 | 12/2006 | Gordon |
| 7,156,087 B1 | 1/2007 | Churchill et al. |
| 7,157,675 B2 | 1/2007 | Imura |
| 7,166,822 B1 | 1/2007 | Chang et al. |
| 7,171,923 B2 | 2/2007 | Hayakawa et al. |
| 7,208,701 B2 | 4/2007 | Fraccon et al. |
| 7,208,702 B2 | 4/2007 | Choi |
| 7,238,921 B2 | 7/2007 | Beesley et al. |
| 7,250,587 B2 | 7/2007 | Ely et al. |
| 7,250,588 B2 | 7/2007 | Ely et al. |
| 7,261,101 B2 | 8/2007 | Kim |
| 7,276,677 B1 | 10/2007 | Shelton |
| 7,285,751 B2 | 10/2007 | Li |
| 7,304,271 B2 | 12/2007 | Cho et al. |
| 7,317,173 B2 | 1/2008 | Bartelick et al. |
| 7,322,279 B2 | 1/2008 | Cartigny et al. |
| 7,322,280 B2 | 1/2008 | Seurat et al. |
| 7,325,481 B2 | 2/2008 | Helm |
| 7,368,688 B2 | 5/2008 | Kim et al. |
| 7,373,874 B2 | 5/2008 | Seurat et al. |
| 7,377,208 B2 | 5/2008 | Ho et al. |
| 7,389,721 B2 | 6/2008 | Wanat |
| 7,411,159 B2 | 8/2008 | Oosterling |
| 7,412,922 B2 | 8/2008 | Mclemore |
| 7,418,960 B2 | 9/2008 | Saksena |
| 7,451,691 B2 | 11/2008 | Robertson |
| 7,451,692 B2 | 11/2008 | Baraille et al. |
| 7,468,495 B2 | 12/2008 | Carbone et al. |
| 7,523,696 B2 | 4/2009 | Seurat et al. |
| 7,530,302 B2 | 5/2009 | Stephanou |
| 7,537,004 B2 | 5/2009 | Reay |
| 7,565,862 B2 | 7/2009 | Cartigny et al. |
| 7,605,349 B2 | 10/2009 | Gaynor et al. |
| D604,098 S | 11/2009 | Hamlin |
| 7,619,186 B2 | 11/2009 | Cavada et al. |
| 7,624,674 B2 | 12/2009 | Chameroy et al. |
| 7,637,206 B2 | 12/2009 | Seurat et al. |
| 7,669,521 B2 | 3/2010 | Cartigny et al. |
| 7,669,591 B2 | 3/2010 | Fossati et al. |
| 7,677,160 B2 | 3/2010 | Tippmann, Sr. et al. |
| 7,703,385 B2 | 4/2010 | Seurat et al. |
| 7,718,928 B2 | 5/2010 | He et al. |
| 7,726,508 B2 | 6/2010 | Hasegawa |
| 7,745,763 B2 | 6/2010 | Fraccon et al. |
| 7,759,615 B2 | 7/2010 | Ando et al. |
| 7,762,420 B2 | 7/2010 | Auwaerter et al. |
| 7,766,003 B2 | 8/2010 | Kim et al. |
| 7,775,390 B2 | 8/2010 | De Bastos Reis Portugal et al. |
| 7,800,022 B2 | 9/2010 | Kim |
| 7,810,488 B2 | 10/2010 | Manganiello et al. |
| 7,838,799 B2 | 11/2010 | Freedman |
| 7,856,875 B2 | 12/2010 | Jeon et al. |
| 7,875,836 B2 | 1/2011 | Imura et al. |
| 7,915,568 B2 | 3/2011 | Wang |
| D635,393 S | 4/2011 | Nakatani |
| 7,921,768 B2 | 4/2011 | Fernandez et al. |
| 7,935,914 B2 | 5/2011 | Imura |
| 7,943,888 B2 | 5/2011 | Barnes et al. |
| 7,964,824 B2 | 6/2011 | Moon |
| 7,968,824 B2 | 6/2011 | Lee et al. |
| 7,980,171 B2 | 7/2011 | Groll |
| 8,006,684 B2 | 8/2011 | Lee et al. |
| 8,006,685 B2 | 8/2011 | Bolton et al. |
| 8,011,293 B2 | 9/2011 | McFadden et al. |
| 8,042,533 B2 | 10/2011 | Dobie et al. |
| 8,080,766 B2 | 12/2011 | Frock et al. |
| 8,096,436 B2 | 1/2012 | Rhetat et al. |
| 8,096,440 B2 | 1/2012 | Rhetat et al. |
| 8,152,083 B2 | 4/2012 | Bower et al. |
| 8,166,871 B2 | 5/2012 | Veltrop et al. |
| 8,205,543 B2 | 6/2012 | Rhetat et al. |
| 8,247,751 B2 | 8/2012 | Jagannathan |
| 8,258,435 B2 | 9/2012 | Bonuso et al. |
| 8,267,008 B2 | 9/2012 | Yasuhara |
| D669,730 S | 10/2012 | Mandil |
| 8,276,507 B1 | 10/2012 | Walker |
| 8,286,548 B2 | 10/2012 | Krishnan et al. |
| 8,299,404 B2 | 10/2012 | Van Der Weij |
| 8,302,800 B2 | 11/2012 | Hasegawa |
| 8,304,695 B2 | 11/2012 | Bonuso et al. |
| 8,330,083 B2 | 12/2012 | Moon et al. |
| 8,338,757 B2 | 12/2012 | Isoda et al. |
| 8,369,695 B2 | 2/2013 | Lee et al. |
| 8,378,265 B2 | 2/2013 | Greenwood et al. |
| 8,381,712 B1 | 2/2013 | Simms, II |
| 8,393,262 B1 | 3/2013 | Molayem |
| 8,420,983 B2 | 4/2013 | Ohashi et al. |
| 8,461,488 B2 | 6/2013 | Jeong et al. |
| 8,517,006 B2 | 8/2013 | Frock et al. |
| 8,517,205 B2 | 8/2013 | Thelen |
| 8,525,081 B2 | 9/2013 | Colburn et al. |
| 8,544,381 B2 | 10/2013 | Cartigny et al. |

(56) References Cited

U.S. PATENT DOCUMENTS

| | | |
|---|---|---|
| 8,546,731 B2 | 10/2013 | Pellerin et al. |
| 8,561,525 B2 | 10/2013 | Bauchot et al. |
| 8,578,293 B2 | 11/2013 | Breunig et al. |
| 8,581,137 B2 | 11/2013 | Egenter |
| 8,601,939 B2 | 12/2013 | Saksena et al. |
| 8,604,394 B2 | 12/2013 | Wu et al. |
| 8,618,447 B2 | 12/2013 | De'Longhi |
| 8,637,797 B2 | 1/2014 | Imura |
| D699,514 S | 2/2014 | Lovley et al. |
| 8,640,908 B2 | 2/2014 | Yang et al. |
| 8,674,270 B2 | 3/2014 | Anderson et al. |
| 8,689,680 B2 | 4/2014 | Park |
| 8,695,487 B2 | 4/2014 | Sakane et al. |
| 8,709,905 B2 | 4/2014 | Crayfourd |
| 8,714,391 B2 | 5/2014 | Milanesi |
| 8,726,792 B2 | 5/2014 | Shealy et al. |
| 8,733,574 B2 | 5/2014 | Heidrich et al. |
| D707,078 S | 6/2014 | Rivera et al. |
| 8,739,690 B2 | 6/2014 | Chameroy et al. |
| 8,747,933 B1 | 6/2014 | Mcginn |
| 8,766,144 B2 | 7/2014 | Mcloughlin et al. |
| 8,777,038 B2 | 7/2014 | Wen |
| 8,783,498 B2 | 7/2014 | Li |
| 8,783,947 B2 | 7/2014 | Ferron et al. |
| D710,647 S | 8/2014 | Mandil et al. |
| 8,800,803 B2 | 8/2014 | Stellwag |
| 8,808,772 B2 | 8/2014 | Lubrina et al. |
| 8,813,635 B2 | 8/2014 | Dragan |
| 8,813,989 B2 | 8/2014 | Hoffmann et al. |
| 8,820,220 B2 | 9/2014 | Thelen et al. |
| 8,847,129 B2 | 9/2014 | Kim et al. |
| 8,869,829 B2 | 10/2014 | Hasegawa |
| 8,887,939 B2 | 11/2014 | Chameroy et al. |
| D719,398 S | 12/2014 | Deters |
| D720,571 S | 1/2015 | Deters |
| 8,931,402 B2 | 1/2015 | Chameroy et al. |
| 8,931,659 B2 | 1/2015 | Rhetat et al. |
| 8,944,272 B2 | 2/2015 | Chameroy et al. |
| 8,944,273 B2 | 2/2015 | Chameroy et al. |
| 8,946,604 B2 | 2/2015 | Kaiser et al. |
| 8,960,081 B2 | 2/2015 | Beard et al. |
| 8,973,770 B2 | 3/2015 | He et al. |
| 8,985,372 B2 | 3/2015 | Yang et al. |
| 8,991,307 B2 | 3/2015 | Grözinger et al. |
| 8,993,934 B2 | 3/2015 | Giazzon et al. |
| D727,095 S | 4/2015 | Bak |
| 9,018,566 B2 | 4/2015 | Wang |
| 9,027,468 B2 | 5/2015 | Rhetat et al. |
| 9,035,223 B2 | 5/2015 | Noguchi et al. |
| 9,055,618 B2 | 6/2015 | Bunzel et al. |
| 9,057,526 B2 | 6/2015 | Barritt |
| 9,066,523 B2 | 6/2015 | Seitz et al. |
| 9,115,905 B2 | 8/2015 | Giazzon et al. |
| 9,119,501 B2 | 9/2015 | Xie |
| 9,125,513 B2 | 9/2015 | Kim |
| 9,127,849 B2 | 9/2015 | Kang et al. |
| 9,138,106 B2 | 9/2015 | Walker |
| 9,173,408 B2 | 11/2015 | Yamamoto et al. |
| 9,177,460 B2 | 11/2015 | Fissler |
| 9,182,126 B2 | 11/2015 | Cartwright et al. |
| 9,191,998 B2 | 11/2015 | Hegedis et al. |
| 9,220,362 B2 | 12/2015 | Eades et al. |
| 9,237,829 B2 | 1/2016 | Alet Vidal et al. |
| D749,906 S | 2/2016 | Lee |
| 9,247,842 B2 | 2/2016 | Cheung et al. |
| 9,271,595 B2 | 3/2016 | Lee |
| 9,295,354 B2 | 3/2016 | Sloot et al. |
| 9,295,355 B2 | 3/2016 | Kwag et al. |
| D754,469 S | 4/2016 | Deters |
| 9,301,644 B2 | 4/2016 | Payen et al. |
| 9,314,134 B2 | 4/2016 | Molnar |
| 9,320,381 B2 | 4/2016 | Chameroy et al. |
| 9,326,633 B2 | 5/2016 | Lin |
| 9,339,145 B1 | 5/2016 | Owczarzak |
| 9,341,382 B2 | 5/2016 | Kim |
| 9,345,358 B2 | 5/2016 | Zhang et al. |
| 9,351,495 B2 | 5/2016 | Mcfadden |
| 9,353,954 B2 | 5/2016 | Linnewiel |
| 9,375,021 B2 | 6/2016 | Raghavan et al. |
| 9,414,713 B2 | 8/2016 | Jinzhao |
| 9,433,036 B2 | 8/2016 | Kurimoto et al. |
| 9,439,530 B2 | 9/2016 | Logan et al. |
| D769,058 S | 10/2016 | Lee |
| 9,456,713 B2 | 10/2016 | Backaert et al. |
| 9,470,423 B2 | 10/2016 | Jacob et al. |
| 9,474,412 B2 | 10/2016 | Fung et al. |
| D772,648 S | 11/2016 | Palermo |
| 9,480,364 B2 | 11/2016 | McKee et al. |
| D774,350 S | 12/2016 | Mandil |
| D774,356 S | 12/2016 | Maiorana et al. |
| 9,526,367 B2 | 12/2016 | Anota et al. |
| 9,545,168 B2 | 1/2017 | Gabara |
| 9,565,963 B2 | 2/2017 | Jeon et al. |
| 9,565,964 B2 | 2/2017 | Yang et al. |
| 9,585,509 B2 | 3/2017 | Wassmus et al. |
| 9,596,954 B2 | 3/2017 | Park |
| 9,615,408 B2 | 4/2017 | Metz et al. |
| 9,615,688 B2 | 4/2017 | Shibuya et al. |
| 9,615,691 B2 | 4/2017 | Xiao |
| 9,615,692 B2 | 4/2017 | Hoffmann et al. |
| 9,615,694 B2 | 4/2017 | Yoshidome |
| 9,629,499 B2 | 4/2017 | Kim |
| 9,629,500 B2 | 4/2017 | Chance |
| 9,636,618 B2 | 5/2017 | Fung et al. |
| 9,642,487 B1 | 5/2017 | Mcginn |
| 9,648,975 B2 | 5/2017 | Imura |
| 9,648,985 B2 | 5/2017 | Huang et al. |
| 9,675,197 B2 | 6/2017 | Schobloch et al. |
| 9,681,770 B2 | 6/2017 | Backaert et al. |
| 9,681,773 B2 | 6/2017 | McKee et al. |
| 9,683,747 B2 | 6/2017 | Raghavan et al. |
| 9,700,172 B2 | 7/2017 | Tanaka et al. |
| 9,706,870 B2 | 7/2017 | Hoehn et al. |
| 9,706,871 B2 | 7/2017 | Matthijs |
| 9,717,363 B2 | 8/2017 | Pan |
| 9,717,364 B2 | 8/2017 | Sladecek |
| 9,737,936 B2 | 8/2017 | Linglin et al. |
| 9,743,794 B2 | 8/2017 | Shibuya et al. |
| 9,750,089 B2 | 8/2017 | Wiedemann et al. |
| 9,756,980 B1 | 9/2017 | Li et al. |
| 9,756,981 B2 | 9/2017 | Fung |
| 9,763,531 B2 | 9/2017 | Baraille et al. |
| D801,106 S | 10/2017 | Mirchandani et al. |
| 9,775,461 B2 | 10/2017 | Yang et al. |
| 9,788,678 B2 | 10/2017 | Abe et al. |
| 9,795,250 B2 | 10/2017 | Huang |
| 9,801,487 B2 | 10/2017 | Park et al. |
| 9,801,491 B2 | 10/2017 | Cohade et al. |
| 9,814,355 B2 | 11/2017 | Winter et al. |
| 9,841,261 B2 | 12/2017 | Raghavan et al. |
| 9,854,931 B2 | 1/2018 | Rocklinger et al. |
| 9,854,932 B2 | 1/2018 | Tiruvallur |
| 9,854,941 B2 | 1/2018 | Bonaccorso |
| 9,861,231 B2 | 1/2018 | Kim |
| 9,867,234 B2 | 1/2018 | Thomann et al. |
| 9,872,581 B2 | 1/2018 | Braden et al. |
| 9,872,582 B2 | 1/2018 | Song et al. |
| 9,877,610 B2 | 1/2018 | Bucher et al. |
| 9,883,768 B2 | 2/2018 | Starflinger |
| 9,888,811 B2 | 2/2018 | Zwanenburg et al. |
| 9,890,946 B2 | 2/2018 | Shibuya et al. |
| 9,895,028 B2 | 2/2018 | Gerard et al. |
| 9,900,936 B2 | 2/2018 | Imm et al. |
| 9,903,597 B2 | 2/2018 | Nishijima et al. |
| 9,907,435 B2 | 3/2018 | Kohler et al. |
| 9,909,764 B2 | 3/2018 | Bach |
| 9,924,825 B2 | 3/2018 | Zakowski et al. |
| 9,924,830 B1 | 3/2018 | Glucksman et al. |
| D815,491 S | 4/2018 | Hollinger |
| 9,930,990 B1 | 4/2018 | Gupta et al. |
| 9,936,837 B1 | 4/2018 | Granberry |
| D817,697 S | 5/2018 | Zhao |
| 9,961,721 B2 | 5/2018 | Guilleminot et al. |
| 9,961,929 B2 | 5/2018 | Olsson |

(56) References Cited

U.S. PATENT DOCUMENTS

| | | |
|---|---|---|
| 9,962,029 B2 | 5/2018 | Baraille et al. |
| 9,980,605 B2 | 5/2018 | De Haas et al. |
| 10,016,085 B2 | 7/2018 | Sapire |
| 10,021,889 B2 | 7/2018 | Vinett |
| 10,022,015 B2 | 7/2018 | Marco et al. |
| 10,022,021 B2 | 7/2018 | Sudhir |
| 10,034,578 B2 | 7/2018 | Ahmed |
| D824,717 S | 8/2018 | Allen |
| D826,638 S | 8/2018 | Zhang |
| 10,045,651 B2 | 8/2018 | Huang |
| 10,047,961 B2 | 8/2018 | Choi |
| 10,051,986 B2 | 8/2018 | Schultz et al. |
| 10,051,995 B2 | 8/2018 | Buckley et al. |
| 10,054,317 B2 | 8/2018 | Franzolin |
| 10,057,946 B2 | 8/2018 | Mills et al. |
| 10,058,210 B2 | 8/2018 | Palermo |
| 10,060,632 B2 | 8/2018 | Lim et al. |
| 10,064,518 B2 | 9/2018 | Xiao et al. |
| 10,076,206 B2 | 9/2018 | Chameroy et al. |
| D832,023 S | 10/2018 | Barberi et al. |
| D832,030 S | 10/2018 | Veldeman |
| 10,088,371 B2 | 10/2018 | Kaiser et al. |
| 10,092,128 B2 | 10/2018 | Seitz et al. |
| 10,094,576 B2 | 10/2018 | Kim et al. |
| 10,098,354 B2 | 10/2018 | Faraldi et al. |
| D833,204 S | 11/2018 | Lee |
| 10,117,546 B2 | 11/2018 | Le Grand |
| 10,119,708 B2 | 11/2018 | Bartelick et al. |
| 10,123,556 B2 | 11/2018 | Distaso et al. |
| 10,123,656 B2 | 11/2018 | Shanmugam |
| 10,125,978 B2 | 11/2018 | Shibuya et al. |
| 10,130,205 B2 | 11/2018 | Fung et al. |
| D834,889 S | 12/2018 | Moon et al. |
| 10,143,324 B2 | 12/2018 | Kataoka et al. |
| 10,143,327 B2 | 12/2018 | Freeman et al. |
| 10,154,750 B2 | 12/2018 | Allemand et al. |
| D838,548 S | 1/2019 | Meller |
| 10,172,494 B2 | 1/2019 | Long |
| 10,178,924 B2 | 1/2019 | French et al. |
| 10,194,769 B2 | 2/2019 | Kodden |
| 10,208,964 B2 | 2/2019 | Cupp et al. |
| D842,649 S | 3/2019 | Mishan |
| 10,231,291 B2 | 3/2019 | Kim |
| 10,231,292 B2 | 3/2019 | Kim et al. |
| 10,231,565 B2 | 3/2019 | Song et al. |
| 10,231,574 B2 | 3/2019 | Strang |
| 10,244,883 B2 | 4/2019 | Chameroy et al. |
| 10,253,989 B2 | 4/2019 | Helm et al. |
| 10,258,049 B2 | 4/2019 | Engstrom |
| 10,260,755 B2 | 4/2019 | Bach |
| 10,260,758 B2 | 4/2019 | Colozzo et al. |
| 10,260,759 B2 | 4/2019 | Colozzo et al. |
| 10,271,686 B2 | 4/2019 | Roy |
| 10,274,206 B2 | 4/2019 | Chen |
| 10,278,241 B2 | 4/2019 | Shibuya et al. |
| 10,278,532 B2 | 5/2019 | Metz |
| 10,281,159 B2 | 5/2019 | Park et al. |
| 10,288,311 B2 | 5/2019 | Cho et al. |
| 10,295,192 B2 | 5/2019 | Yoshimura et al. |
| 10,299,621 B1 | 5/2019 | Bourgeois et al. |
| 10,327,587 B2 | 6/2019 | Liao |
| 10,330,323 B2 | 6/2019 | Kim et al. |
| 10,342,375 B2 | 7/2019 | Chen |
| 10,344,988 B2 | 7/2019 | Gattei |
| 10,349,775 B2 | 7/2019 | Lego et al. |
| 10,360,812 B2 | 7/2019 | Koennings et al. |
| 10,368,403 B2 | 7/2019 | Hayashi et al. |
| 10,368,681 B2 | 8/2019 | Kataoka et al. |
| 10,376,087 B2 | 8/2019 | Cornelissen |
| 10,385,550 B2 | 8/2019 | Lu et al. |
| 10,390,656 B2 | 8/2019 | Gill et al. |
| 10,398,249 B2 | 9/2019 | Becker et al. |
| 10,405,686 B2 | 9/2019 | Patel et al. |
| 10,405,697 B2 | 9/2019 | Gill et al. |
| 10,405,698 B2 | 9/2019 | Gill et al. |
| 10,413,109 B2 | 9/2019 | Krebs et al. |
| 10,413,121 B2 | 9/2019 | Gill et al. |
| 10,413,122 B2 | 9/2019 | Gill et al. |
| 10,448,778 B2 | 10/2019 | Watson et al. |
| 10,451,290 B2 | 10/2019 | Mayberry |
| 10,463,186 B2 | 11/2019 | Di Ronco et al. |
| 10,470,609 B2 | 11/2019 | Gill et al. |
| 10,470,614 B2 | 11/2019 | Lang et al. |
| 10,485,378 B2 | 11/2019 | Gill et al. |
| 10,492,637 B2 | 12/2019 | Abe et al. |
| 10,492,638 B2 | 12/2019 | Guegan et al. |
| 10,499,760 B2 | 12/2019 | Blond |
| 10,512,359 B2 | 12/2019 | Xu et al. |
| 10,517,306 B1 | 12/2019 | Meirav |
| 10,524,317 B2 | 12/2019 | Kondo et al. |
| 10,524,604 B2 | 1/2020 | Bjork et al. |
| 10,533,752 B2 | 1/2020 | Faraldi et al. |
| 10,561,273 B2 | 2/2020 | Patel et al. |
| 10,561,274 B2 | 2/2020 | Huang |
| 10,561,277 B1 | 2/2020 | Swayne et al. |
| 10,575,679 B1 | 3/2020 | Cheng et al. |
| 10,578,310 B2 | 3/2020 | Joo et al. |
| 10,588,445 B2 | 3/2020 | Gustavsson |
| 10,602,869 B2 | 3/2020 | Yu et al. |
| D883,014 S | 5/2020 | Varjabedian et al. |
| D883,015 S | 5/2020 | Deng et al. |
| 10,638,868 B1 | 5/2020 | Straight |
| 10,638,869 B2 | 5/2020 | Kataoka et al. |
| 10,638,882 B1 | 5/2020 | He et al. |
| 10,645,765 B2 | 5/2020 | Shibuya et al. |
| 10,667,639 B2 | 6/2020 | Mederer |
| 10,674,855 B2 | 6/2020 | Rosalia et al. |
| 10,674,864 B2 | 6/2020 | Trtic |
| 10,687,650 B2 | 6/2020 | Huang et al. |
| 10,690,352 B2 | 6/2020 | Smith et al. |
| 10,694,753 B2 | 6/2020 | Reese et al. |
| 10,694,882 B2 | 6/2020 | Huang |
| 10,694,891 B2 | 6/2020 | Huang |
| 10,729,282 B2 | 8/2020 | Bonaccorso |
| 10,746,412 B1 | 8/2020 | Artt |
| D903,413 S | 12/2020 | Guerin et al. |
| D914,447 S | 3/2021 | Gill et al. |
| D934,027 S | 10/2021 | Gill et al. |
| 2002/0179587 A1 | 12/2002 | Hui |
| 2002/0185012 A1 | 12/2002 | Yokoyama |
| 2003/0034027 A1 | 2/2003 | Yamamoto et al. |
| 2003/0127447 A1 | 7/2003 | Lin |
| 2004/0035845 A1 | 2/2004 | Moon et al. |
| 2004/0045446 A1 | 3/2004 | Park |
| 2004/0055474 A1 | 3/2004 | Lekic et al. |
| 2004/0112362 A1 | 6/2004 | Bruno et al. |
| 2004/0124197 A1 | 7/2004 | Hasegawa |
| 2004/0163635 A1 | 8/2004 | Thorneywork |
| 2004/0216731 A1 | 11/2004 | Personnettaz et al. |
| 2004/0222208 A1 | 11/2004 | Ko |
| 2004/0253348 A1 | 12/2004 | Woodward et al. |
| 2005/0011370 A1 | 1/2005 | Xu et al. |
| 2005/0034716 A1 | 2/2005 | Harbin |
| 2005/0089318 A1 | 4/2005 | Lai et al. |
| 2005/0223906 A1 | 10/2005 | Xu et al. |
| 2005/0284305 A1 | 12/2005 | Angue |
| 2006/0081235 A1 | 4/2006 | Lundh et al. |
| 2006/0156926 A1 | 7/2006 | Alemao |
| 2007/0045284 A1 | 3/2007 | Balk et al. |
| 2007/0095215 A1 | 5/2007 | Ho et al. |
| 2007/0125768 A1 | 6/2007 | Kim et al. |
| 2007/0158335 A1 | 7/2007 | Mansbery |
| 2007/0199557 A1 | 8/2007 | Von Kaenel |
| 2007/0295221 A1 | 12/2007 | Seurat Guiochet et al. |
| 2008/0022861 A1 | 1/2008 | Ferron |
| 2008/0078371 A1 | 4/2008 | Boscaino |
| 2008/0078755 A1 | 4/2008 | Jeon et al. |
| 2008/0083730 A1 | 4/2008 | Dolgov et al. |
| 2008/0095905 A1 | 4/2008 | Sells et al. |
| 2008/0099008 A1 | 5/2008 | Bolton et al. |
| 2008/0105137 A1 | 5/2008 | Genslak et al. |
| 2008/0142498 A1 | 6/2008 | He et al. |
| 2008/0163764 A1 | 7/2008 | Payen et al. |
| 2008/0173631 A1 | 7/2008 | Gagas et al. |

(56) References Cited

U.S. PATENT DOCUMENTS

| | | |
|---|---|---|
| 2008/0206420 A1 | 8/2008 | Mcfadden |
| 2008/0213447 A1 | 9/2008 | Payen et al. |
| 2008/0223224 A1 | 9/2008 | Martin |
| 2008/0290090 A1 | 11/2008 | Kindler et al. |
| 2008/0314258 A1 | 12/2008 | Martin |
| 2009/0011101 A1 | 1/2009 | Doherty et al. |
| 2009/0013988 A1 | 1/2009 | Kim et al. |
| 2009/0032521 A1 | 2/2009 | Kim et al. |
| 2009/0064868 A1 | 3/2009 | Cartossi |
| 2009/0095166 A1 | 4/2009 | Jian |
| 2009/0134140 A1 | 5/2009 | Van Der Weij |
| 2009/0223380 A1 | 9/2009 | Van |
| 2009/0223386 A1 | 9/2009 | Edwards et al. |
| 2009/0250452 A1 | 10/2009 | Tse |
| 2010/0089248 A1 | 4/2010 | Jones |
| 2010/0136194 A1 | 6/2010 | Schutte |
| 2010/0147159 A1 | 6/2010 | Fossati |
| 2010/0147824 A1 | 6/2010 | Bonuso et al. |
| 2010/0206289 A1 | 8/2010 | Larsen et al. |
| 2010/0282097 A1 | 11/2010 | Schulte |
| 2011/0003048 A1 | 1/2011 | Sugimoto et al. |
| 2011/0095015 A1 | 4/2011 | Kao |
| 2011/0120319 A1 | 5/2011 | Chang |
| 2011/0126719 A1 | 6/2011 | Valance |
| 2011/0146653 A1 | 6/2011 | Kitatani |
| 2011/0147376 A1 | 6/2011 | Ueda et al. |
| 2011/0168158 A1 | 7/2011 | Barkhouse |
| 2011/0248020 A1 | 10/2011 | Yuan |
| 2011/0268153 A1 | 11/2011 | He et al. |
| 2012/0003364 A1 | 1/2012 | Kling et al. |
| 2012/0009317 A1 | 1/2012 | Mclemore |
| 2012/0012584 A1 | 1/2012 | Chameroy et al. |
| 2012/0024164 A1 | 2/2012 | Park et al. |
| 2012/0024169 A1 | 2/2012 | Hsu |
| 2012/0040067 A1 | 2/2012 | Baraille et al. |
| 2012/0048843 A1 | 3/2012 | Feng et al. |
| 2012/0125313 A1 | 5/2012 | Van Der Weij |
| 2012/0174797 A1 | 7/2012 | Froza |
| 2012/0181363 A1 | 7/2012 | Huang |
| 2012/0192722 A1 | 8/2012 | Foster |
| 2012/0192726 A1 | 8/2012 | Clearman et al. |
| 2012/0217236 A1 | 8/2012 | Takagi |
| 2012/0217252 A1 | 8/2012 | Jung |
| 2012/0222665 A1 | 9/2012 | Ahmed |
| 2012/0318149 A1 | 12/2012 | Ahmed |
| 2013/0019759 A1 | 1/2013 | Tumenbatur et al. |
| 2013/0061765 A1 | 3/2013 | Reinhart |
| 2013/0074702 A1 | 3/2013 | Difante |
| 2013/0092145 A1 | 4/2013 | Murphy et al. |
| 2013/0104875 A1 | 5/2013 | Schultz et al. |
| 2013/0156906 A1 | 6/2013 | Raghavan et al. |
| 2013/0180413 A1 | 7/2013 | Tjerkgaast et al. |
| 2013/0180986 A1 | 7/2013 | He et al. |
| 2013/0196038 A1 | 8/2013 | Liu |
| 2013/0255509 A1 | 10/2013 | He et al. |
| 2013/0276643 A1 | 10/2013 | Krolick et al. |
| 2013/0298781 A1 | 11/2013 | Ganuza et al. |
| 2013/0305933 A1 | 11/2013 | Heidrich et al. |
| 2013/0333685 A1 | 12/2013 | Jeong et al. |
| 2014/0021191 A1 | 1/2014 | Moon et al. |
| 2014/0044851 A1 | 2/2014 | Kennedy |
| 2014/0083306 A1 | 3/2014 | Lee |
| 2014/0083992 A1 | 3/2014 | Linnewiel |
| 2014/0102315 A1 | 4/2014 | Park |
| 2014/0157994 A1 | 6/2014 | Ryan et al. |
| 2014/0175085 A1 | 6/2014 | Yang et al. |
| 2014/0199454 A1 | 7/2014 | Storek et al. |
| 2014/0199459 A1 | 7/2014 | Jackson et al. |
| 2014/0201688 A1 | 7/2014 | Guilleminot et al. |
| 2014/0220196 A1 | 8/2014 | Veloo |
| 2014/0227411 A1 | 8/2014 | Popeil et al. |
| 2014/0245898 A1 | 9/2014 | Froza |
| 2014/0246419 A1 | 9/2014 | Li |
| 2014/0251158 A1 | 9/2014 | Yang et al. |
| 2014/0251162 A1 | 9/2014 | Zhou |
| 2014/0318385 A1 | 10/2014 | Kim |
| 2014/0318386 A1 | 10/2014 | Kim |
| 2014/0318387 A1 | 10/2014 | Kim |
| 2014/0318388 A1 | 10/2014 | Kim |
| 2014/0318389 A1 | 10/2014 | Kim |
| 2014/0322417 A1 | 10/2014 | Kim |
| 2014/0348987 A1 | 11/2014 | Cheng et al. |
| 2014/0353316 A1 | 12/2014 | Lin |
| 2014/0360384 A1 | 12/2014 | Kim |
| 2014/0366746 A1 | 12/2014 | Tsai |
| 2014/0370176 A1 | 12/2014 | Imura et al. |
| 2014/0373729 A1 | 12/2014 | Kim et al. |
| 2014/0377417 A1 | 12/2014 | Martinez |
| 2015/0000535 A1 | 1/2015 | Yoshidome et al. |
| 2015/0059595 A1 | 3/2015 | Rand et al. |
| 2015/0083107 A1 | 3/2015 | Busch et al. |
| 2015/0122137 A1 | 5/2015 | Chang |
| 2015/0136769 A1 | 5/2015 | Quinn et al. |
| 2015/0173551 A1 | 6/2015 | Carbone et al. |
| 2015/0192289 A1 | 7/2015 | Gattei et al. |
| 2015/0201788 A1 | 7/2015 | Douma et al. |
| 2015/0201806 A1 | 7/2015 | Yoshidome |
| 2015/0208845 A1 | 7/2015 | Robbins et al. |
| 2015/0208858 A1 | 7/2015 | Robbins et al. |
| 2015/0223627 A1 | 8/2015 | Li et al. |
| 2015/0226438 A1 | 8/2015 | Ozyurt et al. |
| 2015/0250187 A1 | 9/2015 | Sakane et al. |
| 2015/0292750 A1 | 10/2015 | Delrue et al. |
| 2015/0305093 A1 | 10/2015 | Smith et al. |
| 2015/0312964 A1 | 10/2015 | Sorenson et al. |
| 2015/0313399 A1 | 11/2015 | Park |
| 2015/0351578 A1 | 12/2015 | Song et al. |
| 2015/0354827 A1 | 12/2015 | Faraldi et al. |
| 2015/0366399 A1 | 12/2015 | Lee |
| 2015/0366402 A1 | 12/2015 | Wu et al. |
| 2016/0007644 A1 | 1/2016 | Hack et al. |
| 2016/0007789 A1 | 1/2016 | Tiruvallur |
| 2016/0029829 A1 | 2/2016 | Klein |
| 2016/0033141 A1 | 2/2016 | Rizzuto |
| 2016/0037955 A1 | 2/2016 | Kim |
| 2016/0045067 A1 | 2/2016 | Liao |
| 2016/0051077 A1 | 2/2016 | Sloot et al. |
| 2016/0051078 A1 | 2/2016 | Jenkins et al. |
| 2016/0051086 A1 | 2/2016 | De'Longhi |
| 2016/0066738 A1 | 3/2016 | Shibuya et al. |
| 2016/0073814 A1 | 3/2016 | Kiriishi et al. |
| 2016/0081509 A1 | 3/2016 | Delrue et al. |
| 2016/0100707 A1 | 4/2016 | Huang |
| 2016/0100713 A1 | 4/2016 | De Haas et al. |
| 2016/0113432 A1 | 4/2016 | Cornelissen |
| 2016/0113442 A1 | 4/2016 | De Haas et al. |
| 2016/0120363 A1 | 5/2016 | Zwanenburg et al. |
| 2016/0120364 A1 | 5/2016 | De Haas et al. |
| 2016/0123660 A1 | 5/2016 | Peng |
| 2016/0150906 A1 | 6/2016 | Lee et al. |
| 2016/0165676 A1 | 6/2016 | Imm et al. |
| 2016/0174749 A1 | 6/2016 | Eades et al. |
| 2016/0174764 A1 | 6/2016 | Xiao |
| 2016/0174771 A1 | 6/2016 | Benoit et al. |
| 2016/0183722 A1 | 6/2016 | Fisher |
| 2016/0192808 A1 | 7/2016 | Van Der Burg et al. |
| 2016/0198882 A1 | 7/2016 | Linglin |
| 2016/0198883 A1 | 7/2016 | Wang et al. |
| 2016/0206131 A1 | 7/2016 | Chien |
| 2016/0206139 A1 | 7/2016 | Johnson |
| 2016/0206140 A1 | 7/2016 | Johnson et al. |
| 2016/0219653 A1 | 7/2016 | Kim et al. |
| 2016/0220057 A1 | 8/2016 | Smith et al. |
| 2016/0235078 A1 | 8/2016 | Farina et al. |
| 2016/0235239 A1 | 8/2016 | Patadia |
| 2016/0253080 A1 | 9/2016 | Ban et al. |
| 2016/0270596 A1 | 9/2016 | Allemand et al. |
| 2016/0278563 A1 | 9/2016 | Choudhary |
| 2016/0278565 A1 | 9/2016 | Chameroy et al. |
| 2016/0281994 A1 | 9/2016 | Nuessler |
| 2016/0309940 A1 | 10/2016 | Valance et al. |
| 2016/0309956 A1 | 10/2016 | Glucksman |
| 2016/0316525 A1 | 10/2016 | Vainionpaa |
| 2016/0316968 A1 | 11/2016 | Linglin |

(56) References Cited

U.S. PATENT DOCUMENTS

| | | |
|---|---|---|
| 2016/0324359 A1 | 11/2016 | Aboujassoum et al. |
| 2016/0327280 A1 | 11/2016 | Smith et al. |
| 2016/0345766 A1 | 12/2016 | Sapire |
| 2016/0353913 A1 | 12/2016 | Chameroy et al. |
| 2016/0353914 A1 | 12/2016 | Chameroy et al. |
| 2016/0353915 A1 | 12/2016 | Chameroy et al. |
| 2016/0353916 A1 | 12/2016 | Chameroy et al. |
| 2016/0360922 A1 | 12/2016 | Xiao et al. |
| 2016/0367061 A1 | 12/2016 | Chou |
| 2016/0374510 A1 | 12/2016 | Albizuri Landazabal |
| 2017/0000293 A1 | 1/2017 | Sladecek et al. |
| 2017/0016623 A1 | 1/2017 | Rabie et al. |
| 2017/0020334 A1 | 1/2017 | Sorenson et al. |
| 2017/0055770 A1 | 3/2017 | Case |
| 2017/0065127 A1 | 3/2017 | Bonaccorso |
| 2017/0071034 A1 | 3/2017 | Metz |
| 2017/0079475 A1 | 3/2017 | Buckley et al. |
| 2017/0089590 A1 | 3/2017 | Bruin-Slot et al. |
| 2017/0095105 A1 | 4/2017 | Clark et al. |
| 2017/0099977 A1 | 4/2017 | Liu |
| 2017/0099984 A1 | 4/2017 | Koetz |
| 2017/0099990 A1 | 4/2017 | Magnouloux et al. |
| 2017/0099995 A1 | 4/2017 | Magnouloux |
| 2017/0119192 A1 | 5/2017 | Sanseverino |
| 2017/0127871 A1 | 5/2017 | Leung |
| 2017/0172335 A1 | 6/2017 | Colas et al. |
| 2017/0181564 A1 | 6/2017 | He et al. |
| 2017/0199658 A1 | 7/2017 | Stoufer et al. |
| 2017/0224157 A1 | 8/2017 | Rummel et al. |
| 2017/0231257 A1 | 8/2017 | Thul et al. |
| 2017/0231415 A1 | 8/2017 | Cheng et al. |
| 2017/0231430 A1 | 8/2017 | Moon et al. |
| 2017/0245674 A1 | 8/2017 | Imura |
| 2017/0245683 A1 | 8/2017 | Chen et al. |
| 2017/0245686 A1 | 8/2017 | Man |
| 2017/0251872 A1 | 9/2017 | Li et al. |
| 2017/0251874 A1 | 9/2017 | Sladecek |
| 2017/0258268 A1 | 9/2017 | Kazanas et al. |
| 2017/0276378 A1 | 9/2017 | Faraldi et al. |
| 2017/0280914 A1 | 10/2017 | Kumar et al. |
| 2017/0290452 A1 | 10/2017 | Guillaume et al. |
| 2017/0295993 A1 | 10/2017 | Li et al. |
| 2017/0303740 A1 | 10/2017 | Bonaccorso |
| 2017/0319006 A1 | 11/2017 | Niizumi |
| 2017/0332823 A1 | 11/2017 | Sanseverino |
| 2017/0343221 A1 | 11/2017 | Swayne et al. |
| 2017/0360238 A1 | 12/2017 | Bogazzi |
| 2017/0360254 A1 | 12/2017 | Muhr et al. |
| 2017/0360255 A1 | 12/2017 | Karau |
| 2017/0367514 A1 | 12/2017 | In 'T Groen et al. |
| 2017/0370595 A1 | 12/2017 | Yang et al. |
| 2018/0000285 A1 | 1/2018 | Backus et al. |
| 2018/0007744 A1 | 1/2018 | Nonaka et al. |
| 2018/0014683 A1 | 1/2018 | Glucksman |
| 2018/0028017 A1 | 2/2018 | Wu |
| 2018/0035698 A1 | 2/2018 | McNerney et al. |
| 2018/0070596 A1 | 3/2018 | Kim et al. |
| 2018/0073739 A1 | 3/2018 | Dumenil |
| 2018/0078089 A1 | 3/2018 | Sauer et al. |
| 2018/0103796 A1 | 4/2018 | Park |
| 2018/0110355 A1 | 4/2018 | Huang et al. |
| 2018/0110373 A1 | 4/2018 | Zhang et al. |
| 2018/0116264 A1 | 5/2018 | De Winter et al. |
| 2018/0116438 A1 | 5/2018 | He et al. |
| 2018/0125293 A1 | 5/2018 | McNerney et al. |
| 2018/0125294 A1 | 5/2018 | Conte et al. |
| 2018/0132648 A1 | 5/2018 | Furlanetto et al. |
| 2018/0140126 A1 | 5/2018 | Van Dillen |
| 2018/0143086 A1 | 5/2018 | Stoufer et al. |
| 2018/0146812 A1 | 5/2018 | Choi |
| 2018/0153329 A1 | 6/2018 | Glucksman et al. |
| 2018/0160840 A1 | 6/2018 | De'Longhi |
| 2018/0160849 A1 | 6/2018 | Hebert, Jr. et al. |
| 2018/0177322 A1 | 6/2018 | Kim |
| 2018/0177343 A1 | 6/2018 | Bonaccorso |
| 2018/0184843 A1 | 7/2018 | Kim et al. |
| 2018/0184848 A1 | 7/2018 | De'Longhi |
| 2018/0192825 A1 | 7/2018 | Popeil et al. |
| 2018/0199615 A1 | 7/2018 | Zhang et al. |
| 2018/0199756 A1 | 7/2018 | Huang |
| 2018/0206672 A1 | 7/2018 | Grace et al. |
| 2018/0206677 A1 | 7/2018 | Ivarsson et al. |
| 2018/0213965 A1 | 8/2018 | Li |
| 2018/0220498 A1 | 8/2018 | Jeon et al. |
| 2018/0220842 A1 | 8/2018 | Delrue et al. |
| 2018/0228318 A1 | 8/2018 | Zwanenburg et al. |
| 2018/0235396 A1 | 8/2018 | Schönenberger |
| 2018/0238560 A1 | 8/2018 | Deng et al. |
| 2018/0255967 A1 | 9/2018 | Haas et al. |
| 2018/0255971 A1 | 9/2018 | Moon et al. |
| 2018/0263084 A1 | 9/2018 | Yoshino et al. |
| 2018/0263402 A1 | 9/2018 | Li |
| 2018/0266697 A1 | 9/2018 | Dash et al. |
| 2018/0270915 A1 | 9/2018 | Koetz |
| 2018/0271321 A1 | 9/2018 | Delrue et al. |
| 2018/0271322 A1 | 9/2018 | Thai et al. |
| 2018/0271323 A1 | 9/2018 | Zhang et al. |
| 2018/0279832 A1 | 10/2018 | Ohta et al. |
| 2018/0289212 A1 | 10/2018 | Sladecek et al. |
| 2018/0296019 A1 | 10/2018 | Kim et al. |
| 2018/0299138 A1 | 10/2018 | Faraldi et al. |
| 2018/0303285 A1 | 10/2018 | Cheng |
| 2018/0317691 A1 | 11/2018 | Huang |
| 2018/0317692 A1 | 11/2018 | Huang |
| 2018/0317693 A1 | 11/2018 | Huang |
| 2018/0325311 A1 | 11/2018 | Feldman et al. |
| 2018/0325313 A1 | 11/2018 | De'Longhi et al. |
| 2018/0325318 A1 | 11/2018 | De'Longhi et al. |
| 2018/0325322 A1 | 11/2018 | De'Longhi et al. |
| 2018/0328645 A1 | 11/2018 | Wang et al. |
| 2018/0332993 A1 | 11/2018 | Cho et al. |
| 2018/0332994 A1 | 11/2018 | Hasegawa |
| 2018/0332999 A1 | 11/2018 | Nie |
| 2018/0333004 A1 | 11/2018 | De'Longhi et al. |
| 2018/0333005 A1 | 11/2018 | Fritz et al. |
| 2018/0338636 A1 | 11/2018 | Ceccoli |
| 2018/0340695 A1 | 11/2018 | Park et al. |
| 2018/0344085 A1 | 12/2018 | Dutter |
| 2018/0347829 A1 | 12/2018 | Martini et al. |
| 2018/0353007 A1 | 12/2018 | Eberhart et al. |
| 2018/0353010 A1 | 12/2018 | Delrue et al. |
| 2018/0359823 A1 | 12/2018 | Shin et al. |
| 2018/0363915 A1 | 12/2018 | Bu |
| 2018/0368615 A1 | 12/2018 | Luo et al. |
| 2019/0000267 A1 | 1/2019 | Li et al. |
| 2019/0003718 A1 | 1/2019 | Lee et al. |
| 2019/0008310 A1 | 1/2019 | Kim et al. |
| 2019/0008316 A1 | 1/2019 | Kim et al. |
| 2019/0014940 A1 | 1/2019 | Cheung et al. |
| 2019/0014943 A1 | 1/2019 | Gill et al. |
| 2019/0021142 A1 | 1/2019 | Mizuta et al. |
| 2019/0021537 A1 | 1/2019 | Park |
| 2019/0024904 A1 | 1/2019 | Ueda et al. |
| 2019/0029459 A1 | 1/2019 | Gao et al. |
| 2019/0045964 A1 | 2/2019 | Gill et al. |
| 2019/0045973 A1 | 2/2019 | Gill et al. |
| 2019/0053521 A1 | 2/2019 | Tian et al. |
| 2019/0053655 A1 | 2/2019 | Panasik et al. |
| 2019/0059627 A1 | 2/2019 | Kitatani et al. |
| 2019/0059628 A1 | 2/2019 | Liu et al. |
| 2019/0059647 A1 | 2/2019 | Floessholzer |
| 2019/0069706 A1 | 3/2019 | Kim et al. |
| 2019/0069719 A1 | 3/2019 | Huang et al. |
| 2019/0075956 A1 | 3/2019 | Bang et al. |
| 2019/0075971 A1 | 3/2019 | Noca et al. |
| 2019/0082876 A1 | 3/2019 | Shi et al. |
| 2019/0086075 A1 | 3/2019 | Albert |
| 2019/0099039 A1 | 4/2019 | Li et al. |
| 2019/0110629 A1 | 4/2019 | Truong et al. |
| 2019/0110638 A1 | 4/2019 | Li et al. |
| 2019/0117005 A1 | 4/2019 | Kettavong et al. |
| 2019/0120504 A1 | 4/2019 | Lee et al. |
| 2019/0133364 A1 | 5/2019 | Tian et al. |
| 2019/0137112 A1 | 5/2019 | Lego et al. |

(56) References Cited

U.S. PATENT DOCUMENTS

| | | |
|---|---|---|
| 2019/0142215 A1 | 5/2019 | Popeil et al. |
| 2019/0142220 A1 | 5/2019 | Shirali et al. |
| 2019/0167028 A1 | 6/2019 | Wang et al. |
| 2019/0170361 A1 | 6/2019 | Ha et al. |
| 2019/0174944 A1 | 6/2019 | Luo et al. |
| 2019/0174945 A1 | 6/2019 | Oti |
| 2019/0203944 A1 | 7/2019 | Cho et al. |
| 2019/0215916 A1 | 7/2019 | Yang et al. |
| 2019/0223658 A1 | 7/2019 | He |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2019/0239518 A1 | 8/2019 | McKee et al. |
| 2019/0246829 A1 | 8/2019 | Zhou et al. |
| 2019/0246830 A1 | 8/2019 | Ametepe et al. |
| 2019/0246835 A1 | 8/2019 | Tsai |
| 2019/0254473 A1 | 8/2019 | Anthony et al. |
| 2019/0254474 A1 | 8/2019 | Anthony et al. |
| 2019/0254476 A1 | 8/2019 | Anthony et al. |
| 2019/0269272 A1 | 9/2019 | Itzkowitz |
| 2019/0269276 A1 | 9/2019 | Gvili |
| 2019/0274461 A1 | 9/2019 | Nichols |
| 2019/0274462 A1 | 9/2019 | Moon |
| 2019/0282021 A1 | 9/2019 | Dion et al. |
| 2019/0282029 A1 | 9/2019 | Goldberg |
| 2019/0290062 A1 | 9/2019 | Prieto et al. |
| 2019/0290072 A1 | 9/2019 | Prieto et al. |
| 2019/0298100 A1 | 10/2019 | Li et al. |
| 2019/0309955 A1 | 10/2019 | Castillo et al. |
| 2019/0309956 A1 | 10/2019 | Buschman et al. |
| 2019/0313832 A1 | 10/2019 | Lee et al. |
| 2019/0313833 A1 | 10/2019 | Li et al. |
| 2019/0313844 A1 | 10/2019 | Nadendla et al. |
| 2019/0316783 A1 | 10/2019 | Lee et al. |
| 2019/0327979 A1 | 10/2019 | Yang et al. |
| 2019/0328169 A1 | 10/2019 | Fogacci |
| 2019/0328175 A1 | 10/2019 | Bancroft |
| 2019/0335934 A1 | 11/2019 | Delrue et al. |
| 2019/0374058 A1 | 12/2019 | Blond et al. |
| 2019/0374064 A1 | 12/2019 | Gill et al. |
| 2019/0380524 A1 | 12/2019 | Guegan et al. |
| 2019/0381654 A1 | 12/2019 | Oleynik |
| 2019/0387913 A1 | 12/2019 | Lee et al. |
| 2019/0387921 A1 | 12/2019 | Lemberger et al. |
| 2019/0387922 A1 | 12/2019 | Jin et al. |
| 2019/0387923 A1 | 12/2019 | Anthony et al. |
| 2020/0000262 A1 | 1/2020 | Delrue et al. |
| 2020/0008601 A1 | 1/2020 | Cao |
| 2020/0008616 A1 | 1/2020 | Moon |
| 2020/0018475 A1 | 1/2020 | Sim et al. |
| 2020/0029721 A1 | 1/2020 | Kang et al. |
| 2020/0029731 A1 | 1/2020 | Hunt |
| 2020/0033009 A1 | 1/2020 | Lee et al. |
| 2020/0046157 A1 | 2/2020 | Leung |
| 2020/0053842 A1 | 2/2020 | Jeon et al. |
| 2020/0054024 A1 | 2/2020 | Sun et al. |
| 2020/0060472 A1 | 2/2020 | Gill et al. |
| 2020/0060473 A1 | 2/2020 | Gill et al. |
| 2020/0069113 A1 | 3/2020 | Anthony et al. |
| 2020/0080726 A1 | 3/2020 | Polster |
| 2020/0088415 A1 | 3/2020 | Lee et al. |
| 2020/0088443 A1 | 3/2020 | Williams et al. |
| 2020/0113380 A1 | 4/2020 | Lu |
| 2020/0121129 A1 | 4/2020 | Wittig |
| 2020/0128995 A1 | 4/2020 | Patel et al. |
| 2020/0128996 A1 | 4/2020 | Qin et al. |
| 2020/0128997 A1 | 4/2020 | Qin et al. |
| 2020/0128998 A1 | 4/2020 | Qin et al. |
| 2020/0138043 A1 | 5/2020 | Hoerter |
| 2020/0138229 A1 | 5/2020 | Kweon et al. |
| 2020/0138239 A1 | 5/2020 | Gromowski et al. |
| 2020/0146496 A1 | 5/2020 | Patadia |
| 2020/0146497 A1 | 5/2020 | Shi et al. |
| 2020/0170438 A1 | 6/2020 | Freymiller et al. |
| 2020/0178583 A1 | 6/2020 | Chen et al. |
| 2020/0182485 A1 | 6/2020 | Ball et al. |
| 2020/0187315 A1 | 6/2020 | Carcano et al. |
| 2020/0187697 A1 | 6/2020 | Stewart et al. |
| 2020/0187698 A1 | 6/2020 | Peng et al. |
| 2020/0187710 A1 | 6/2020 | Guo et al. |
| 2020/0187712 A1 | 6/2020 | Gill et al. |
| 2020/0191404 A1 | 6/2020 | Song |
| 2020/0205245 A1 | 6/2020 | Ma et al. |
| 2020/0205595 A1 | 7/2020 | He |
| 2020/0214500 A1 | 7/2020 | Popeil et al. |
| 2020/0221900 A1 | 7/2020 | Itzkowitz |
| 2020/0229637 A1 | 7/2020 | Han et al. |
| 2020/0229638 A1 | 7/2020 | Lu |
| 2020/0229640 A1 | 7/2020 | Han et al. |
| 2020/0240647 A1 | 7/2020 | Itzkowitz et al. |
| 2020/0253420 A1 | 8/2020 | He et al. |
| 2020/0260907 A1 | 8/2020 | Lu et al. |
| 2020/0268189 A1 | 8/2020 | Anthony |
| 2020/0278116 A1 | 9/2020 | Kobayashi et al. |
| 2020/0329908 A1 | 10/2020 | Chen |
| 2020/0329909 A1 | 10/2020 | Conrad et al. |
| 2020/0337497 A1 | 10/2020 | Anthony et al. |
| 2020/0405086 A1 | 12/2020 | Dos Santos et al. |
| 2021/0000292 A1 | 1/2021 | Siu et al. |
| 2021/0000296 A1 | 1/2021 | Kennedy et al. |

FOREIGN PATENT DOCUMENTS

| | | |
|---|---|---|
| CN | 1218653 A | 6/1999 |
| CN | 2358794 Y | 1/2000 |
| CN | 2389593 Y | 8/2000 |
| CN | 2450993 Y | 10/2001 |
| CN | 2469839 Y | 1/2002 |
| CN | 2479871 Y | 3/2002 |
| CN | 1139352 C | 2/2004 |
| CN | 1148142 C | 5/2004 |
| CN | 1158963 C | 7/2004 |
| CN | 2719176 Y | 8/2005 |
| CN | 1820685 A | 8/2006 |
| CN | 1883351 A | 12/2006 |
| CN | 2855256 Y | 1/2007 |
| CN | 2904903 Y | 5/2007 |
| CN | 1981682 A | 6/2007 |
| CN | 1985727 A | 6/2007 |
| CN | 1989884 A | 7/2007 |
| CN | 100998476 A | 7/2007 |
| CN | 101023842 A | 8/2007 |
| CN | 101053485 A | 10/2007 |
| CN | 200987595 Y | 12/2007 |
| CN | 101099635 A | 1/2008 |
| CN | 101108064 A | 1/2008 |
| CN | 101112291 A | 1/2008 |
| CN | 101112292 A | 1/2008 |
| CN | 101112293 A | 1/2008 |
| CN | 101142448 A | 3/2008 |
| CN | 101185556 A | 5/2008 |
| CN | 100401957 C | 7/2008 |
| CN | 101209179 A | 7/2008 |
| CN | 101209180 A | 7/2008 |
| CN | 201079267 Y | 7/2008 |
| CN | 100425186 C | 10/2008 |
| CN | 100428906 C | 10/2008 |
| CN | 101273834 A | 10/2008 |

(56) References Cited

FOREIGN PATENT DOCUMENTS

| CN | 201139427 Y | 10/2008 |
|---|---|---|
| CN | 101322614 A | 12/2008 |
| CN | 201197609 Y | 2/2009 |
| CN | 100464682 C | 3/2009 |
| CN | 100469289 C | 3/2009 |
| CN | 201207144 Y | 3/2009 |
| CN | 101432608 A | 5/2009 |
| CN | 101438929 A | 5/2009 |
| CN | 100496350 C | 6/2009 |
| CN | 100522018 C | 8/2009 |
| CN | 100531628 C | 8/2009 |
| CN | 100534363 C | 9/2009 |
| CN | 101518409 A | 9/2009 |
| CN | 100559999 C | 11/2009 |
| CN | 201365839 Y | 12/2009 |
| CN | 101669761 A | 3/2010 |
| CN | 101692958 A | 4/2010 |
| CN | 101766439 A | 7/2010 |
| CN | 101766443 A | 7/2010 |
| CN | 101791190 A | 8/2010 |
| CN | 101828856 A | 9/2010 |
| CN | 101856086 A | 10/2010 |
| CN | 201602600 U | 10/2010 |
| CN | 201624512 U | 11/2010 |
| CN | 101936550 A | 1/2011 |
| CN | 101940273 A | 1/2011 |
| CN | 101420893 B | 2/2011 |
| CN | 101977536 A | 2/2011 |
| CN | 201888709 U | 7/2011 |
| CN | 201929758 U | 8/2011 |
| CN | 201948771 U | 8/2011 |
| CN | 102178443 A | 9/2011 |
| CN | 102178445 A | 9/2011 |
| CN | 102178464 A | 9/2011 |
| CN | 201958652 U | 9/2011 |
| CN | 201996364 U | 10/2011 |
| CN | 101305890 B | 11/2011 |
| CN | 102240164 A | 11/2011 |
| CN | 102307500 A | 1/2012 |
| CN | 102313306 A | 1/2012 |
| CN | 102349791 A | 2/2012 |
| CN | 202151310 U | 2/2012 |
| CN | 102368936 A | 3/2012 |
| CN | 202184614 U | 4/2012 |
| CN | 202207075 U | 5/2012 |
| CN | 202234720 U | 5/2012 |
| CN | 202234761 U | 5/2012 |
| CN | 202312830 U | 7/2012 |
| CN | 202312886 U | 7/2012 |
| CN | 102670079 A | 9/2012 |
| CN | 202408428 U | 9/2012 |
| CN | 202408455 U | 9/2012 |
| CN | 102755120 A | 10/2012 |
| CN | 102824120 A | 12/2012 |
| CN | 202619362 U | 12/2012 |
| CN | 102100481 B | 1/2013 |
| CN | 102883641 A | 1/2013 |
| CN | 202636678 U | 1/2013 |
| CN | 202698888 U | 1/2013 |
| CN | 103006045 A | 4/2013 |
| CN | 103006092 A | 4/2013 |
| CN | 202858889 U | 4/2013 |
| CN | 103142128 A | 6/2013 |
| CN | 103142151 A | 6/2013 |
| CN | 103169371 A | 6/2013 |
| CN | 103179884 A | 6/2013 |
| CN | 202960194 U | 6/2013 |
| CN | 202981682 U | 6/2013 |
| CN | 203000535 U | 6/2013 |
| CN | 103188947 A | 7/2013 |
| CN | 103188970 A | 7/2013 |
| CN | 103220947 A | 7/2013 |
| CN | 103222807 A | 7/2013 |
| CN | 203041954 U | 7/2013 |
| CN | 203041955 U | 7/2013 |
| CN | 102342739 B | 8/2013 |
| CN | 203122175 U | 8/2013 |
| CN | 103299132 A | 9/2013 |
| CN | 203195497 U | 9/2013 |
| CN | 203195499 U | 9/2013 |
| CN | 103375826 A | 10/2013 |
| CN | 203234602 U | 10/2013 |
| CN | 203234613 U | 10/2013 |
| CN | 102319018 B | 11/2013 |
| CN | 203302862 U | 11/2013 |
| CN | 203302892 U | 11/2013 |
| CN | 103445669 A | 12/2013 |
| CN | 102397005 B | 1/2014 |
| CN | 103491830 A | 1/2014 |
| CN | 203407931 U | 1/2014 |
| CN | 103649643 A | 3/2014 |
| CN | 203483269 U | 3/2014 |
| CN | 103750730 A | 4/2014 |
| CN | 203539138 U | 4/2014 |
| CN | 203597771 U | 5/2014 |
| CN | 203597772 U | 5/2014 |
| CN | 203615383 U | 5/2014 |
| CN | 203634023 U | 6/2014 |
| CN | 203647141 U | 6/2014 |
| CN | 203662545 U | 6/2014 |
| CN | 103892696 A | 7/2014 |
| CN | 103948308 A | 7/2014 |
| CN | 203693372 U | 7/2014 |
| CN | 203723888 U | 7/2014 |
| CN | 104000478 A | 8/2014 |
| CN | 203762926 U | 8/2014 |
| CN | 203776718 U | 8/2014 |
| CN | 203776719 U | 8/2014 |
| CN | 203776729 U | 8/2014 |
| CN | 203828675 U | 9/2014 |
| CN | 203873602 U | 10/2014 |
| CN | 203885286 U | 10/2014 |
| CN | 104138200 A | 11/2014 |
| CN | 203914511 U | 11/2014 |
| CN | 203953373 U | 11/2014 |
| CN | 203970073 U | 12/2014 |
| CN | 203970160 U | 12/2014 |
| CN | 203987492 U | 12/2014 |
| CN | 203987520 U | 12/2014 |
| CN | 203987550 U | 12/2014 |
| CN | 203987551 U | 12/2014 |
| CN | 204016055 U | 12/2014 |
| CN | 204016056 U | 12/2014 |
| CN | 204049362 U | 12/2014 |
| CN | 204091768 U | 1/2015 |
| CN | 104323708 A | 2/2015 |
| CN | 104337407 A | 2/2015 |
| CN | 104367182 A | 2/2015 |
| CN | 204133165 U | 2/2015 |
| CN | 204133291 U | 2/2015 |
| CN | 204158183 U | 2/2015 |
| CN | 104433841 A | 3/2015 |
| CN | 204192406 U | 3/2015 |
| CN | 104490294 A | 4/2015 |
| CN | 102917623 B | 5/2015 |
| CN | 104586233 A | 5/2015 |
| CN | 104613515 A | 5/2015 |
| CN | 104622274 A | 5/2015 |
| CN | 104676681 A | 6/2015 |
| CN | 104688019 A | 6/2015 |
| CN | 104706212 A | 6/2015 |
| CN | 103284618 B | 7/2015 |
| CN | 104754992 A | 7/2015 |
| CN | 104757872 A | 7/2015 |
| CN | 104814665 A | 8/2015 |
| CN | 104856561 A | 8/2015 |
| CN | 104856563 A | 8/2015 |
| CN | 204580991 U | 8/2015 |
| CN | 104873098 A | 9/2015 |
| CN | 104887063 A | 9/2015 |
| CN | 204636063 U | 9/2015 |
| CN | 104983318 A | 10/2015 |
| CN | 104997394 A | 10/2015 |
| CN | 204697804 U | 10/2015 |

(56) References Cited

FOREIGN PATENT DOCUMENTS

| | | | |
|---|---|---|---|
| CN | 105011741 | A | 11/2015 |
| CN | 105030035 | A | 11/2015 |
| CN | 204734374 | U | 11/2015 |
| CN | 204743846 | U | 11/2015 |
| CN | 204765197 | U | 11/2015 |
| CN | 204797615 | U | 11/2015 |
| CN | 204797616 | U | 11/2015 |
| CN | 103813738 | B | 12/2015 |
| CN | 105105624 | A | 12/2015 |
| CN | 105105626 | A | 12/2015 |
| CN | 105167592 | A | 12/2015 |
| CN | 105193301 | A | 12/2015 |
| CN | 204839219 | U | 12/2015 |
| CN | 204889693 | U | 12/2015 |
| CN | 105212730 | A | 1/2016 |
| CN | 105231802 | A | 1/2016 |
| CN | 105231811 | A | 1/2016 |
| CN | 105231812 | A | 1/2016 |
| CN | 105231813 | A | 1/2016 |
| CN | 105266565 | A | 1/2016 |
| CN | 105266577 | A | 1/2016 |
| CN | 204995259 | U | 1/2016 |
| CN | 105286491 | A | 2/2016 |
| CN | 105286496 | A | 2/2016 |
| CN | 105286498 | A | 2/2016 |
| CN | 105286627 | A | 2/2016 |
| CN | 105326332 | A | 2/2016 |
| CN | 105342454 | A | 2/2016 |
| CN | 205018872 | U | 2/2016 |
| CN | 205018878 | U | 2/2016 |
| CN | 105380512 | A | 3/2016 |
| CN | 105380513 | A | 3/2016 |
| CN | 105380514 | A | 3/2016 |
| CN | 105411378 | A | 3/2016 |
| CN | 105411379 | A | 3/2016 |
| CN | 105433778 | A | 3/2016 |
| CN | 105433779 | A | 3/2016 |
| CN | 105451610 | A | 3/2016 |
| CN | 105455628 | A | 4/2016 |
| CN | 105455664 | A | 4/2016 |
| CN | 105455671 | A | 4/2016 |
| CN | 105476461 | A | 4/2016 |
| CN | 105476464 | A | 4/2016 |
| CN | 105476472 | A | 4/2016 |
| CN | 105476491 | A | 4/2016 |
| CN | 105496184 | A | 4/2016 |
| CN | 105496185 | A | 4/2016 |
| CN | 105496224 | A | 4/2016 |
| CN | 205126014 | U | 4/2016 |
| CN | 105534269 | A | 5/2016 |
| CN | 105559571 | A | 5/2016 |
| CN | 105595792 | A | 5/2016 |
| CN | 105595802 | A | 5/2016 |
| CN | 105595803 | A | 5/2016 |
| CN | 205197727 | U | 5/2016 |
| CN | 205214967 | U | 5/2016 |
| CN | 205215045 | U | 5/2016 |
| CN | 102440681 | B | 6/2016 |
| CN | 102783908 | B | 6/2016 |
| CN | 103648337 | B | 6/2016 |
| CN | 105615638 | A | 6/2016 |
| CN | 105615639 | A | 6/2016 |
| CN | 105615686 | A | 6/2016 |
| CN | 105640299 | A | 6/2016 |
| CN | 105640302 | A | 6/2016 |
| CN | 105640308 | A | 6/2016 |
| CN | 105640309 | A | 6/2016 |
| CN | 105640351 | A | 6/2016 |
| CN | 105662112 | A | 6/2016 |
| CN | 105662125 | A | 6/2016 |
| CN | 105662126 | A | 6/2016 |
| CN | 105662127 | A | 6/2016 |
| CN | 105708312 | A | 6/2016 |
| CN | 205322075 | U | 6/2016 |
| CN | 104068757 | B | 7/2016 |
| CN | 104605727 | B | 7/2016 |
| CN | 105725730 | A | 7/2016 |
| CN | 105725829 | A | 7/2016 |
| CN | 105768844 | A | 7/2016 |
| CN | 105768859 | A | 7/2016 |
| CN | 105768860 | A | 7/2016 |
| CN | 103908166 | B | 8/2016 |
| CN | 105816023 | A | 8/2016 |
| CN | 105832176 | A | 8/2016 |
| CN | 105852667 | A | 8/2016 |
| CN | 105852668 | A | 8/2016 |
| CN | 105902144 | A | 8/2016 |
| CN | 105902150 | A | 8/2016 |
| CN | 205410811 | U | 8/2016 |
| CN | 205425108 | U | 8/2016 |
| CN | 205433281 | U | 8/2016 |
| CN | 205433317 | U | 8/2016 |
| CN | 205433320 | U | 8/2016 |
| CN | 105919411 | A | 9/2016 |
| CN | 105919417 | A | 9/2016 |
| CN | 105935244 | A | 9/2016 |
| CN | 105935258 | A | 9/2016 |
| CN | 105972653 | A | 9/2016 |
| CN | 205568641 | U | 9/2016 |
| CN | 205568772 | U | 9/2016 |
| CN | 205597052 | U | 9/2016 |
| CN | 105982529 | A | 10/2016 |
| CN | 105982532 | A | 10/2016 |
| CN | 105996737 | A | 10/2016 |
| CN | 105996748 | A | 10/2016 |
| CN | 105996752 | A | 10/2016 |
| CN | 105996753 | A | 10/2016 |
| CN | 106037448 | A | 10/2016 |
| CN | 106037457 | A | 10/2016 |
| CN | 106037458 | A | 10/2016 |
| CN | 106073481 | A | 11/2016 |
| CN | 106073517 | A | 11/2016 |
| CN | 106073519 | A | 11/2016 |
| CN | 106108627 | A | 11/2016 |
| CN | 106108630 | A | 11/2016 |
| CN | 106108631 | A | 11/2016 |
| CN | 106166030 | A | 11/2016 |
| CN | 205671926 | U | 11/2016 |
| CN | 205671927 | U | 11/2016 |
| CN | 106175412 | A | 12/2016 |
| CN | 106175423 | A | 12/2016 |
| CN | 106175476 | A | 12/2016 |
| CN | 106175477 | A | 12/2016 |
| CN | 106213979 | A | 12/2016 |
| CN | 106235878 | A | 12/2016 |
| CN | 106235892 | A | 12/2016 |
| CN | 106235893 | A | 12/2016 |
| CN | 205831665 | U | 12/2016 |
| CN | 106264085 | A | 1/2017 |
| CN | 106264095 | A | 1/2017 |
| CN | 106292340 | A | 1/2017 |
| CN | 106343895 | A | 1/2017 |
| CN | 205860134 | U | 1/2017 |
| CN | 106377158 | A | 2/2017 |
| CN | 106377159 | A | 2/2017 |
| CN | 106377165 | A | 2/2017 |
| CN | 106388565 | A | 2/2017 |
| CN | 106388572 | A | 2/2017 |
| CN | 106419486 | A | 2/2017 |
| CN | 106419521 | A | 2/2017 |
| CN | 106419524 | A | 2/2017 |
| CN | 106419620 | A | 2/2017 |
| CN | 102805554 | B | 3/2017 |
| CN | 106473623 | A | 3/2017 |
| CN | 106490967 | A | 3/2017 |
| CN | 106510449 | A | 3/2017 |
| CN | 206026100 | U | 3/2017 |
| CN | 206044349 | U | 3/2017 |
| CN | 106551617 | A | 4/2017 |
| CN | 106575469 | A | 4/2017 |
| CN | 106580074 | A | 4/2017 |
| CN | 206062888 | U | 4/2017 |
| CN | 206102391 | U | 4/2017 |
| CN | 206119969 | U | 4/2017 |

(56) References Cited

FOREIGN PATENT DOCUMENTS

| | | |
|---|---|---|
| CN | 106618154 A | 5/2017 |
| CN | 106618156 A | 5/2017 |
| CN | 106667244 A | 5/2017 |
| CN | 106691171 A | 5/2017 |
| CN | 206166710 U | 5/2017 |
| CN | 206166726 U | 5/2017 |
| CN | 106802584 A | 6/2017 |
| CN | 106805744 A | 6/2017 |
| CN | 106805746 A | 6/2017 |
| CN | 106805747 A | 6/2017 |
| CN | 106805749 A | 6/2017 |
| CN | 106805750 A | 6/2017 |
| CN | 106805752 A | 6/2017 |
| CN | 106820951 A | 6/2017 |
| CN | 106820954 A | 6/2017 |
| CN | 106821017 A | 6/2017 |
| CN | 106852641 A | 6/2017 |
| CN | 106859298 A | 6/2017 |
| CN | 106889875 A | 6/2017 |
| CN | 106889876 A | 6/2017 |
| CN | 106901591 A | 6/2017 |
| CN | 106901592 A | 6/2017 |
| CN | 105054772 B | 7/2017 |
| CN | 106913201 A | 7/2017 |
| CN | 106923655 A | 7/2017 |
| CN | 106943000 A | 7/2017 |
| CN | 106943002 A | 7/2017 |
| CN | 106955017 A | 7/2017 |
| CN | 106974548 A | 7/2017 |
| CN | 106983360 A | 7/2017 |
| CN | 105212693 B | 8/2017 |
| CN | 106993928 A | 8/2017 |
| CN | 106998961 A | 8/2017 |
| CN | 107019418 A | 8/2017 |
| CN | 107019419 A | 8/2017 |
| CN | 107019420 A | 8/2017 |
| CN | 107019423 A | 8/2017 |
| CN | 107048976 A | 8/2017 |
| CN | 107048991 A | 8/2017 |
| CN | 107048993 A | 8/2017 |
| CN | 107049054 A | 8/2017 |
| CN | 107049058 A | 8/2017 |
| CN | 107105914 A | 8/2017 |
| CN | 206371913 U | 8/2017 |
| CN | 206381064 U | 8/2017 |
| CN | 104334066 B | 9/2017 |
| CN | 107136910 A | 9/2017 |
| CN | 107136911 A | 9/2017 |
| CN | 107149395 A | 9/2017 |
| CN | 107149398 A | 9/2017 |
| CN | 105054773 B | 10/2017 |
| CN | 105142473 B | 10/2017 |
| CN | 107224188 A | 10/2017 |
| CN | 107224197 A | 10/2017 |
| CN | 107232962 A | 10/2017 |
| CN | 107259978 A | 10/2017 |
| CN | 107290094 A | 10/2017 |
| CN | 107296485 A | 10/2017 |
| CN | 107296486 A | 10/2017 |
| CN | 107296487 A | 10/2017 |
| CN | 107296488 A | 10/2017 |
| CN | 107296489 A | 10/2017 |
| CN | 107296490 A | 10/2017 |
| CN | 107296493 A | 10/2017 |
| CN | 107296494 A | 10/2017 |
| CN | 104643954 B | 11/2017 |
| CN | 107307729 A | 11/2017 |
| CN | 107307730 A | 11/2017 |
| CN | 107334388 A | 11/2017 |
| CN | 107361637 A | 11/2017 |
| CN | 107397431 A | 11/2017 |
| CN | 107411540 A | 12/2017 |
| CN | 107411542 A | 12/2017 |
| CN | 107432668 A | 12/2017 |
| CN | 107440490 A | 12/2017 |
| CN | 107468052 A | 12/2017 |
| CN | 107495849 A | 12/2017 |
| CN | 107495856 A | 12/2017 |
| CN | 107510356 A | 12/2017 |
| CN | 107510379 A | 12/2017 |
| CN | 206687606 U | 12/2017 |
| CN | 206700038 U | 12/2017 |
| CN | 206777230 U | 12/2017 |
| CN | 206807803 U | 12/2017 |
| CN | 206807804 U | 12/2017 |
| CN | 106213986 B | 1/2018 |
| CN | 107550250 A | 1/2018 |
| CN | 107550258 A | 1/2018 |
| CN | 107595153 A | 1/2018 |
| CN | 107616686 A | 1/2018 |
| CN | 206867128 U | 1/2018 |
| CN | 107647763 A | 2/2018 |
| CN | 107647769 A | 2/2018 |
| CN | 107647771 A | 2/2018 |
| CN | 107647772 A | 2/2018 |
| CN | 107647773 A | 2/2018 |
| CN | 107647777 A | 2/2018 |
| CN | 107660996 A | 2/2018 |
| CN | 107660997 A | 2/2018 |
| CN | 107684336 A | 2/2018 |
| CN | 107684337 A | 2/2018 |
| CN | 107684338 A | 2/2018 |
| CN | 107684339 A | 2/2018 |
| CN | 107684340 A | 2/2018 |
| CN | 107684341 A | 2/2018 |
| CN | 107684342 A | 2/2018 |
| CN | 107684357 A | 2/2018 |
| CN | 107692806 A | 2/2018 |
| CN | 107702838 A | 2/2018 |
| CN | 107713732 A | 2/2018 |
| CN | 107713733 A | 2/2018 |
| CN | 107713734 A | 2/2018 |
| CN | 107713774 A | 2/2018 |
| CN | 107726388 A | 2/2018 |
| CN | 106419522 B | 3/2018 |
| CN | 107752726 A | 3/2018 |
| CN | 107752751 A | 3/2018 |
| CN | 107752752 A | 3/2018 |
| CN | 107752788 A | 3/2018 |
| CN | 107773021 A | 3/2018 |
| CN | 107773026 A | 3/2018 |
| CN | 107773029 A | 3/2018 |
| CN | 107773090 A | 3/2018 |
| CN | 107788820 A | 3/2018 |
| CN | 107788827 A | 3/2018 |
| CN | 107811499 A | 3/2018 |
| CN | 107811517 A | 3/2018 |
| CN | 107811518 A | 3/2018 |
| CN | 107822492 A | 3/2018 |
| CN | 107822494 A | 3/2018 |
| CN | 107822496 A | 3/2018 |
| CN | 107822524 A | 3/2018 |
| CN | 107836981 A | 3/2018 |
| CN | 107836986 A | 3/2018 |
| CN | 107836988 A | 3/2018 |
| CN | 207084680 U | 3/2018 |
| CN | 207101150 U | 3/2018 |
| CN | 107874584 A | 4/2018 |
| CN | 107874599 A | 4/2018 |
| CN | 107874601 A | 4/2018 |
| CN | 107874602 A | 4/2018 |
| CN | 107898351 A | 4/2018 |
| CN | 107928388 A | 4/2018 |
| CN | 107928395 A | 4/2018 |
| CN | 107951369 A | 4/2018 |
| CN | 107951376 A | 4/2018 |
| CN | 107951407 A | 4/2018 |
| CN | 207202762 U | 4/2018 |
| CN | 207253261 U | 4/2018 |
| CN | 107969907 A | 5/2018 |
| CN | 107969908 A | 5/2018 |
| CN | 107981713 A | 5/2018 |
| CN | 107997571 A | 5/2018 |
| CN | 108013742 A | 5/2018 |

(56) References Cited

FOREIGN PATENT DOCUMENTS

| | | | |
|---|---|---|---|
| CN | 108013743 | A | 5/2018 |
| CN | 108030404 | A | 5/2018 |
| CN | 108041976 | A | 5/2018 |
| CN | 108056670 | A | 5/2018 |
| CN | 108078373 | A | 5/2018 |
| CN | 207355971 | U | 5/2018 |
| CN | 108095570 | A | 6/2018 |
| CN | 108113501 | A | 6/2018 |
| CN | 108143256 | A | 6/2018 |
| CN | 108143259 | A | 6/2018 |
| CN | 108143260 | A | 6/2018 |
| CN | 108143261 | A | 6/2018 |
| CN | 108143262 | A | 6/2018 |
| CN | 108143263 | A | 6/2018 |
| CN | 108143264 | A | 6/2018 |
| CN | 108158418 | A | 6/2018 |
| CN | 108158429 | A | 6/2018 |
| CN | 108201338 | A | 6/2018 |
| CN | 108209547 | A | 6/2018 |
| CN | 207429001 | U | 6/2018 |
| CN | 207492655 | U | 6/2018 |
| CN | 207506440 | U | 6/2018 |
| CN | 104207651 | B | 7/2018 |
| CN | 108244994 | A | 7/2018 |
| CN | 108244995 | A | 7/2018 |
| CN | 108244997 | A | 7/2018 |
| CN | 108244998 | A | 7/2018 |
| CN | 108244999 | A | 7/2018 |
| CN | 108245000 | A | 7/2018 |
| CN | 108245032 | A | 7/2018 |
| CN | 108261055 | A | 7/2018 |
| CN | 108261056 | A | 7/2018 |
| CN | 108261061 | A | 7/2018 |
| CN | 108272336 | A | 7/2018 |
| CN | 108272338 | A | 7/2018 |
| CN | 108294615 | A | 7/2018 |
| CN | 108294616 | A | 7/2018 |
| CN | 108294640 | A | 7/2018 |
| CN | 108309035 | A | 7/2018 |
| CN | 108324096 | A | 7/2018 |
| CN | 207575048 | U | 7/2018 |
| CN | 207604862 | U | 7/2018 |
| CN | 207627123 | U | 7/2018 |
| CN | 207627136 | U | 7/2018 |
| CN | 207640235 | U | 7/2018 |
| CN | 106388570 | B | 8/2018 |
| CN | 106419517 | B | 8/2018 |
| CN | 108354444 | A | 8/2018 |
| CN | 108354466 | A | 8/2018 |
| CN | 108378678 | A | 8/2018 |
| CN | 108378690 | A | 8/2018 |
| CN | 108402888 | A | 8/2018 |
| CN | 108402889 | A | 8/2018 |
| CN | 108402891 | A | 8/2018 |
| CN | 108402920 | A | 8/2018 |
| CN | 108420304 | A | 8/2018 |
| CN | 108433517 | A | 8/2018 |
| CN | 108433529 | A | 8/2018 |
| CN | 108451351 | A | 8/2018 |
| CN | 108451388 | A | 8/2018 |
| CN | 108464732 | A | 8/2018 |
| CN | 207745052 | U | 8/2018 |
| CN | 207754989 | U | 8/2018 |
| CN | 207755036 | U | 8/2018 |
| CN | 106539491 | B | 9/2018 |
| CN | 107019415 | B | 9/2018 |
| CN | 107019416 | B | 9/2018 |
| CN | 108477987 | A | 9/2018 |
| CN | 108497908 | A | 9/2018 |
| CN | 108497914 | A | 9/2018 |
| CN | 108497918 | A | 9/2018 |
| CN | 108497942 | A | 9/2018 |
| CN | 108523645 | A | 9/2018 |
| CN | 108523647 | A | 9/2018 |
| CN | 108523649 | A | 9/2018 |
| CN | 108542272 | A | 9/2018 |
| CN | 108552969 | A | 9/2018 |
| CN | 108552989 | A | 9/2018 |
| CN | 108567309 | A | 9/2018 |
| CN | 108567321 | A | 9/2018 |
| CN | 108567322 | A | 9/2018 |
| CN | 108577514 | A | 9/2018 |
| CN | 108577580 | A | 9/2018 |
| CN | 207804077 | U | 9/2018 |
| CN | 207804095 | U | 9/2018 |
| CN | 207855533 | U | 9/2018 |
| CN | 207855579 | U | 9/2018 |
| CN | 105167591 | B | 10/2018 |
| CN | 106264094 | B | 10/2018 |
| CN | 108606627 | A | 10/2018 |
| CN | 108618592 | A | 10/2018 |
| CN | 108618593 | A | 10/2018 |
| CN | 108618594 | A | 10/2018 |
| CN | 108618595 | A | 10/2018 |
| CN | 108618597 | A | 10/2018 |
| CN | 108618651 | A | 10/2018 |
| CN | 108634771 | A | 10/2018 |
| CN | 108634777 | A | 10/2018 |
| CN | 108634807 | A | 10/2018 |
| CN | 108652431 | A | 10/2018 |
| CN | 108652432 | A | 10/2018 |
| CN | 108670021 | A | 10/2018 |
| CN | 108670023 | A | 10/2018 |
| CN | 108670048 | A | 10/2018 |
| CN | 108703644 | A | 10/2018 |
| CN | 108703645 | A | 10/2018 |
| CN | 108703675 | A | 10/2018 |
| CN | 207940738 | U | 10/2018 |
| CN | 207940739 | U | 10/2018 |
| CN | 207940743 | U | 10/2018 |
| CN | 207940754 | U | 10/2018 |
| CN | 106580073 | B | 11/2018 |
| CN | 108720548 | A | 11/2018 |
| CN | 108720577 | A | 11/2018 |
| CN | 108720581 | A | 11/2018 |
| CN | 108720584 | A | 11/2018 |
| CN | 108720585 | A | 11/2018 |
| CN | 108720586 | A | 11/2018 |
| CN | 108720633 | A | 11/2018 |
| CN | 108720650 | A | 11/2018 |
| CN | 108732958 | A | 11/2018 |
| CN | 108771466 | A | 11/2018 |
| CN | 108771488 | A | 11/2018 |
| CN | 108771489 | A | 11/2018 |
| CN | 108784323 | A | 11/2018 |
| CN | 108784324 | A | 11/2018 |
| CN | 108784330 | A | 11/2018 |
| CN | 108784401 | A | 11/2018 |
| CN | 108814274 | A | 11/2018 |
| CN | 108836104 | A | 11/2018 |
| CN | 108836105 | A | 11/2018 |
| CN | 108836107 | A | 11/2018 |
| CN | 108836108 | A | 11/2018 |
| CN | 108836131 | A | 11/2018 |
| CN | 108851966 | A | 11/2018 |
| CN | 108851969 | A | 11/2018 |
| CN | 108888087 | A | 11/2018 |
| CN | 108888099 | A | 11/2018 |
| CN | 108903620 | A | 11/2018 |
| CN | 108903621 | A | 11/2018 |
| CN | 208031026 | U | 11/2018 |
| CN | 208031027 | U | 11/2018 |
| CN | 208031028 | U | 11/2018 |
| CN | 208081098 | U | 11/2018 |
| CN | 208081104 | U | 11/2018 |
| CN | 208081108 | U | 11/2018 |
| CN | 106419520 | B | 12/2018 |
| CN | 106419526 | B | 12/2018 |
| CN | 108926239 | A | 12/2018 |
| CN | 108926249 | A | 12/2018 |
| CN | 108937520 | A | 12/2018 |
| CN | 108937525 | A | 12/2018 |
| CN | 108937556 | A | 12/2018 |
| CN | 108937558 | A | 12/2018 |

(56) References Cited

FOREIGN PATENT DOCUMENTS

| | | | |
|---|---|---|---|
| CN | 108937559 | A | 12/2018 |
| CN | 108937560 | A | 12/2018 |
| CN | 108937629 | A | 12/2018 |
| CN | 108955959 | A | 12/2018 |
| CN | 108968659 | A | 12/2018 |
| CN | 108968660 | A | 12/2018 |
| CN | 108968662 | A | 12/2018 |
| CN | 108968663 | A | 12/2018 |
| CN | 108968667 | A | 12/2018 |
| CN | 108968668 | A | 12/2018 |
| CN | 108968669 | A | 12/2018 |
| CN | 108991918 | A | 12/2018 |
| CN | 108991919 | A | 12/2018 |
| CN | 109008595 | A | 12/2018 |
| CN | 109008597 | A | 12/2018 |
| CN | 109008598 | A | 12/2018 |
| CN | 109008663 | A | 12/2018 |
| CN | 109008669 | A | 12/2018 |
| CN | 109077624 | A | 12/2018 |
| CN | 208192913 | U | 12/2018 |
| CN | 208192914 | U | 12/2018 |
| CN | 208192915 | U | 12/2018 |
| CN | 208192916 | U | 12/2018 |
| CN | 208192917 | U | 12/2018 |
| CN | 208192920 | U | 12/2018 |
| CN | 208192921 | U | 12/2018 |
| CN | 208211922 | U | 12/2018 |
| CN | 208228802 | U | 12/2018 |
| CN | 208259529 | U | 12/2018 |
| CN | 106562666 | B | 1/2019 |
| CN | 106606293 | B | 1/2019 |
| CN | 106724784 | B | 1/2019 |
| CN | 106820956 | B | 1/2019 |
| CN | 106820957 | B | 1/2019 |
| CN | 107019417 | B | 1/2019 |
| CN | 109106231 | A | 1/2019 |
| CN | 109247837 | A | 1/2019 |
| CN | 109276159 | A | 1/2019 |
| CN | 208300842 | U | 1/2019 |
| CN | 208319025 | U | 1/2019 |
| CN | 208319027 | U | 1/2019 |
| CN | 208371607 | U | 1/2019 |
| CN | 208435215 | U | 1/2019 |
| CN | 109363520 | A | 2/2019 |
| CN | 208463763 | U | 2/2019 |
| CN | 208510802 | U | 2/2019 |
| CN | 106388566 | B | 3/2019 |
| CN | 107174116 | B | 3/2019 |
| CN | 107174117 | B | 3/2019 |
| CN | 109393956 | A | 3/2019 |
| CN | 109393957 | A | 3/2019 |
| CN | 109393958 | A | 3/2019 |
| CN | 109394005 | A | 3/2019 |
| CN | 109419298 | A | 3/2019 |
| CN | 109419319 | A | 3/2019 |
| CN | 109419327 | A | 3/2019 |
| CN | 109419328 | A | 3/2019 |
| CN | 109419329 | A | 3/2019 |
| CN | 109419330 | A | 3/2019 |
| CN | 109419331 | A | 3/2019 |
| CN | 109419332 | A | 3/2019 |
| CN | 109419333 | A | 3/2019 |
| CN | 109419334 | A | 3/2019 |
| CN | 109419335 | A | 3/2019 |
| CN | 109419336 | A | 3/2019 |
| CN | 109427506 | A | 3/2019 |
| CN | 109431233 | A | 3/2019 |
| CN | 109431254 | A | 3/2019 |
| CN | 109431255 | A | 3/2019 |
| CN | 109431257 | A | 3/2019 |
| CN | 109431258 | A | 3/2019 |
| CN | 109452851 | A | 3/2019 |
| CN | 109452852 | A | 3/2019 |
| CN | 109452854 | A | 3/2019 |
| CN | 109452857 | A | 3/2019 |
| CN | 109452875 | A | 3/2019 |
| CN | 109459181 | A | 3/2019 |
| CN | 109463998 | A | 3/2019 |
| CN | 109463999 | A | 3/2019 |
| CN | 109464000 | A | 3/2019 |
| CN | 109464001 | A | 3/2019 |
| CN | 109480604 | A | 3/2019 |
| CN | 109480605 | A | 3/2019 |
| CN | 109480614 | A | 3/2019 |
| CN | 109497826 | A | 3/2019 |
| CN | 109497827 | A | 3/2019 |
| CN | 109512275 | A | 3/2019 |
| CN | 109512276 | A | 3/2019 |
| CN | 109527982 | A | 3/2019 |
| CN | 109527983 | A | 3/2019 |
| CN | 208551168 | U | 3/2019 |
| CN | 208551408 | U | 3/2019 |
| CN | 208610644 | U | 3/2019 |
| CN | 208610659 | U | 3/2019 |
| CN | 208625445 | U | 3/2019 |
| CN | 109549449 | A | 4/2019 |
| CN | 109549466 | A | 4/2019 |
| CN | 109549468 | A | 4/2019 |
| CN | 109549469 | A | 4/2019 |
| CN | 109549470 | A | 4/2019 |
| CN | 109556147 | A | 4/2019 |
| CN | 109567553 | A | 4/2019 |
| CN | 109567575 | A | 4/2019 |
| CN | 109567576 | A | 4/2019 |
| CN | 109567577 | A | 4/2019 |
| CN | 109567579 | A | 4/2019 |
| CN | 109567582 | A | 4/2019 |
| CN | 109567583 | A | 4/2019 |
| CN | 109567610 | A | 4/2019 |
| CN | 109567612 | A | 4/2019 |
| CN | 109567619 | A | 4/2019 |
| CN | 109588972 | A | 4/2019 |
| CN | 109588973 | A | 4/2019 |
| CN | 109589011 | A | 4/2019 |
| CN | 109602265 | A | 4/2019 |
| CN | 109602274 | A | 4/2019 |
| CN | 109605463 | A | 4/2019 |
| CN | 109619970 | A | 4/2019 |
| CN | 109662607 | A | 4/2019 |
| CN | 109674341 | A | 4/2019 |
| CN | 109674342 | A | 4/2019 |
| CN | 109674357 | A | 4/2019 |
| CN | 109681927 | A | 4/2019 |
| CN | 109691855 | A | 4/2019 |
| CN | 109691858 | A | 4/2019 |
| CN | 109691863 | A | 4/2019 |
| CN | 109691875 | A | 4/2019 |
| CN | 109691878 | A | 4/2019 |
| CN | 109691880 | A | 4/2019 |
| CN | 109691882 | A | 4/2019 |
| CN | 109691905 | A | 4/2019 |
| CN | 109694242 | A | 4/2019 |
| CN | 109696196 | A | 4/2019 |
| CN | 208709591 | U | 4/2019 |
| CN | 208740748 | U | 4/2019 |
| CN | 208755746 | U | 4/2019 |
| CN | 208755752 | U | 4/2019 |
| CN | 208755753 | U | 4/2019 |
| CN | 208755759 | U | 4/2019 |
| CN | 208784365 | U | 4/2019 |
| CN | 109744849 | A | 5/2019 |
| CN | 109793430 | A | 5/2019 |
| CN | 109820432 | A | 5/2019 |
| CN | 208808155 | U | 5/2019 |
| CN | 208837695 | U | 5/2019 |
| CN | 208851291 | U | 5/2019 |
| CN | 208864113 | U | 5/2019 |
| CN | 208909747 | U | 5/2019 |
| CN | 208909882 | U | 5/2019 |
| CN | 208909883 | U | 5/2019 |
| CN | 105996805 | B | 6/2019 |
| CN | 109870938 | A | 6/2019 |
| CN | 109875418 | A | 6/2019 |
| CN | 109892967 | A | 6/2019 |

(56) References Cited

FOREIGN PATENT DOCUMENTS

| | | | |
|---|---|---|---|
| CN | 208941868 U | 6/2019 |
| CN | 208973499 U | 6/2019 |
| CN | 208973501 U | 6/2019 |
| CN | 208973502 U | 6/2019 |
| CN | 208973503 U | 6/2019 |
| CN | 208973504 U | 6/2019 |
| CN | 208973507 U | 6/2019 |
| CN | 208988575 U | 6/2019 |
| CN | 209003634 U | 6/2019 |
| CN | 106108697 B | 7/2019 |
| CN | 109953636 A | 7/2019 |
| CN | 109953642 A | 7/2019 |
| CN | 109965667 A | 7/2019 |
| CN | 109965672 A | 7/2019 |
| CN | 109965682 A | 7/2019 |
| CN | 109965683 A | 7/2019 |
| CN | 109965684 A | 7/2019 |
| CN | 109965688 A | 7/2019 |
| CN | 109965689 A | 7/2019 |
| CN | 109965691 A | 7/2019 |
| CN | 109965692 A | 7/2019 |
| CN | 109965710 A | 7/2019 |
| CN | 109984561 A | 7/2019 |
| CN | 109984563 A | 7/2019 |
| CN | 109984574 A | 7/2019 |
| CN | 109984576 A | 7/2019 |
| CN | 109984577 A | 7/2019 |
| CN | 109984578 A | 7/2019 |
| CN | 109984580 A | 7/2019 |
| CN | 109984581 A | 7/2019 |
| CN | 109984582 A | 7/2019 |
| CN | 109984583 A | 7/2019 |
| CN | 109984585 A | 7/2019 |
| CN | 109984586 A | 7/2019 |
| CN | 109984587 A | 7/2019 |
| CN | 109984588 A | 7/2019 |
| CN | 109984589 A | 7/2019 |
| CN | 109984590 A | 7/2019 |
| CN | 109984591 A | 7/2019 |
| CN | 109984592 A | 7/2019 |
| CN | 109984594 A | 7/2019 |
| CN | 109984595 A | 7/2019 |
| CN | 109984623 A | 7/2019 |
| CN | 109986453 A | 7/2019 |
| CN | 109996475 A | 7/2019 |
| CN | 109998370 A | 7/2019 |
| CN | 109998371 A | 7/2019 |
| CN | 109998385 A | 7/2019 |
| CN | 110013163 A | 7/2019 |
| CN | 110013181 A | 7/2019 |
| CN | 110025214 A | 7/2019 |
| CN | 110025215 A | 7/2019 |
| CN | 110037535 A | 7/2019 |
| CN | 110056916 A | 7/2019 |
| CN | 110063650 A | 7/2019 |
| CN | 110063671 A | 7/2019 |
| CN | 209058897 U | 7/2019 |
| CN | 209090836 U | 7/2019 |
| CN | 209090929 U | 7/2019 |
| CN | 209090938 U | 7/2019 |
| CN | 209090939 U | 7/2019 |
| CN | 209090943 U | 7/2019 |
| CN | 209090950 U | 7/2019 |
| CN | 209090955 U | 7/2019 |
| CN | 209090956 U | 7/2019 |
| CN | 209090957 U | 7/2019 |
| CN | 209136189 U | 7/2019 |
| CN | 209136190 U | 7/2019 |
| CN | 106419618 B | 8/2019 |
| CN | 110074647 A | 8/2019 |
| CN | 110074685 A | 8/2019 |
| CN | 110074690 A | 8/2019 |
| CN | 110089931 A | 8/2019 |
| CN | 110089932 A | 8/2019 |
| CN | 110101301 A | 8/2019 |
| CN | 110101303 A | 8/2019 |
| CN | 110101304 A | 8/2019 |
| CN | 110101319 A | 8/2019 |
| CN | 110115500 A | 8/2019 |
| CN | 110123118 A | 8/2019 |
| CN | 110123132 A | 8/2019 |
| CN | 110123133 A | 8/2019 |
| CN | 110123134 A | 8/2019 |
| CN | 110123137 A | 8/2019 |
| CN | 110141104 A | 8/2019 |
| CN | 110141110 A | 8/2019 |
| CN | 110141111 A | 8/2019 |
| CN | 110141112 A | 8/2019 |
| CN | 110150957 A | 8/2019 |
| CN | 209202775 U | 8/2019 |
| CN | 209220022 U | 8/2019 |
| CN | 209252407 U | 8/2019 |
| CN | 209269447 U | 8/2019 |
| CN | 209285276 U | 8/2019 |
| CN | 209300780 U | 8/2019 |
| CN | 209315656 U | 8/2019 |
| CN | 209315657 U | 8/2019 |
| CN | 110192764 A | 9/2019 |
| CN | 110192765 A | 9/2019 |
| CN | 110192766 A | 9/2019 |
| CN | 110192767 A | 9/2019 |
| CN | 110192768 A | 9/2019 |
| CN | 110200471 A | 9/2019 |
| CN | 110200472 A | 9/2019 |
| CN | 110200493 A | 9/2019 |
| CN | 110200494 A | 9/2019 |
| CN | 110200495 A | 9/2019 |
| CN | 110213984 A | 9/2019 |
| CN | 110236363 A | 9/2019 |
| CN | 110236364 A | 9/2019 |
| CN | 110236379 A | 9/2019 |
| CN | 110250904 A | 9/2019 |
| CN | 110250905 A | 9/2019 |
| CN | 110250920 A | 9/2019 |
| CN | 110269506 A | 9/2019 |
| CN | 110269507 A | 9/2019 |
| CN | 110269508 A | 9/2019 |
| CN | 110279291 A | 9/2019 |
| CN | 110279292 A | 9/2019 |
| CN | 110279308 A | 9/2019 |
| CN | 110279317 A | 9/2019 |
| CN | 209360444 U | 9/2019 |
| CN | 209360464 U | 9/2019 |
| CN | 209436923 U | 9/2019 |
| CN | 209436924 U | 9/2019 |
| CN | 209436925 U | 9/2019 |
| CN | 209436942 U | 9/2019 |
| CN | 209437002 U | 9/2019 |
| CN | 110292303 A | 10/2019 |
| CN | 110292304 A | 10/2019 |
| CN | 110301814 A | 10/2019 |
| CN | 110301815 A | 10/2019 |
| CN | 110313805 A | 10/2019 |
| CN | 110313810 A | 10/2019 |
| CN | 110313811 A | 10/2019 |
| CN | 110313812 A | 10/2019 |
| CN | 110313813 A | 10/2019 |
| CN | 110313814 A | 10/2019 |
| CN | 110313816 A | 10/2019 |
| CN | 110313817 A | 10/2019 |
| CN | 110313818 A | 10/2019 |
| CN | 110313819 A | 10/2019 |
| CN | 110326958 A | 10/2019 |
| CN | 110338639 A | 10/2019 |
| CN | 110338647 A | 10/2019 |
| CN | 110353467 A | 10/2019 |
| CN | 110353469 A | 10/2019 |
| CN | 110353497 A | 10/2019 |
| CN | 110367838 A | 10/2019 |
| CN | 110384387 A | 10/2019 |
| CN | 110384389 A | 10/2019 |
| CN | 209450331 U | 10/2019 |
| CN | 209518760 U | 10/2019 |
| CN | 209518767 U | 10/2019 |

(56) References Cited

FOREIGN PATENT DOCUMENTS

| | | | |
|---|---|---|---|
| CN | 209528876 U | 10/2019 |
| CN | 209547775 U | 10/2019 |
| CN | 110393437 A | 11/2019 |
| CN | 110403454 A | 11/2019 |
| CN | 110403455 A | 11/2019 |
| CN | 110403457 A | 11/2019 |
| CN | 110403458 A | 11/2019 |
| CN | 110419942 A | 11/2019 |
| CN | 110419943 A | 11/2019 |
| CN | 110430793 A | 11/2019 |
| CN | 110432763 A | 11/2019 |
| CN | 110432764 A | 11/2019 |
| CN | 110432765 A | 11/2019 |
| CN | 110448164 A | 11/2019 |
| CN | 110448165 A | 11/2019 |
| CN | 110448189 A | 11/2019 |
| CN | 110464199 A | 11/2019 |
| CN | 110464200 A | 11/2019 |
| CN | 110464212 A | 11/2019 |
| CN | 110475493 A | 11/2019 |
| CN | 110477742 A | 11/2019 |
| CN | 110477743 A | 11/2019 |
| CN | 110477762 A | 11/2019 |
| CN | 110477764 A | 11/2019 |
| CN | 110495774 A | 11/2019 |
| CN | 110507152 A | 11/2019 |
| CN | 110507166 A | 11/2019 |
| CN | 110507168 A | 11/2019 |
| CN | 110507170 A | 11/2019 |
| CN | 110507171 A | 11/2019 |
| CN | 110507176 A | 11/2019 |
| CN | 110507181 A | 11/2019 |
| CN | 110507198 A | 11/2019 |
| CN | 110507199 A | 11/2019 |
| CN | 110520022 A | 11/2019 |
| CN | 209564018 U | 11/2019 |
| CN | 209610822 U | 11/2019 |
| CN | 209610824 U | 11/2019 |
| CN | 209610827 U | 11/2019 |
| CN | 209629508 U | 11/2019 |
| CN | 209644658 U | 11/2019 |
| CN | 110522315 A | 12/2019 |
| CN | 110537836 A | 12/2019 |
| CN | 110537849 A | 12/2019 |
| CN | 110547657 A | 12/2019 |
| CN | 110547674 A | 12/2019 |
| CN | 110547675 A | 12/2019 |
| CN | 110547694 A | 12/2019 |
| CN | 110558827 A | 12/2019 |
| CN | 110558832 A | 12/2019 |
| CN | 110558858 A | 12/2019 |
| CN | 110558861 A | 12/2019 |
| CN | 110575049 A | 12/2019 |
| CN | 110575062 A | 12/2019 |
| CN | 110575077 A | 12/2019 |
| CN | 110575083 A | 12/2019 |
| CN | 110584329 A | 12/2019 |
| CN | 110584470 A | 12/2019 |
| CN | 110584472 A | 12/2019 |
| CN | 110604465 A | 12/2019 |
| CN | 110604469 A | 12/2019 |
| CN | 110613306 A | 12/2019 |
| CN | 110613311 A | 12/2019 |
| CN | 110613323 A | 12/2019 |
| CN | 110613324 A | 12/2019 |
| CN | 110613326 A | 12/2019 |
| CN | 110613327 A | 12/2019 |
| CN | 110613329 A | 12/2019 |
| CN | 110613331 A | 12/2019 |
| CN | 110613365 A | 12/2019 |
| CN | 110613366 A | 12/2019 |
| CN | 110623519 A | 12/2019 |
| CN | 110623533 A | 12/2019 |
| CN | 110623534 A | 12/2019 |
| CN | 110623535 A | 12/2019 |
| CN | 110623551 A | 12/2019 |
| CN | 110623572 A | 12/2019 |
| CN | 209733609 U | 12/2019 |
| CN | 209750794 U | 12/2019 |
| CN | 209770158 U | 12/2019 |
| CN | 209826266 U | 12/2019 |
| CN | 209826275 U | 12/2019 |
| CN | 209863297 U | 12/2019 |
| CN | 209863352 U | 12/2019 |
| CN | 209863353 U | 12/2019 |
| CN | 209863354 U | 12/2019 |
| CN | 209863355 U | 12/2019 |
| CN | 209863450 U | 12/2019 |
| CN | 110638322 A | 1/2020 |
| CN | 110652172 A | 1/2020 |
| CN | 110652188 A | 1/2020 |
| CN | 110652191 A | 1/2020 |
| CN | 110652192 A | 1/2020 |
| CN | 110652193 A | 1/2020 |
| CN | 110652196 A | 1/2020 |
| CN | 110652197 A | 1/2020 |
| CN | 110652211 A | 1/2020 |
| CN | 110652217 A | 1/2020 |
| CN | 110663725 A | 1/2020 |
| CN | 110664235 A | 1/2020 |
| CN | 110664236 A | 1/2020 |
| CN | 110664237 A | 1/2020 |
| CN | 110664239 A | 1/2020 |
| CN | 110680203 A | 1/2020 |
| CN | 110680206 A | 1/2020 |
| CN | 110693316 A | 1/2020 |
| CN | 110710864 A | 1/2020 |
| CN | 110710892 A | 1/2020 |
| CN | 110720826 A | 1/2020 |
| CN | 209995969 U | 1/2020 |
| CN | 107065634 B | 2/2020 |
| CN | 107773030 B | 2/2020 |
| CN | 110742492 A | 2/2020 |
| CN | 110742500 A | 2/2020 |
| CN | 110754924 A | 2/2020 |
| CN | 110754925 A | 2/2020 |
| CN | 110754926 A | 2/2020 |
| CN | 110754927 A | 2/2020 |
| CN | 110754929 A | 2/2020 |
| CN | 110754930 A | 2/2020 |
| CN | 110754931 A | 2/2020 |
| CN | 110754932 A | 2/2020 |
| CN | 110754933 A | 2/2020 |
| CN | 110772114 A | 2/2020 |
| CN | 110772115 A | 2/2020 |
| CN | 110772125 A | 2/2020 |
| CN | 110786730 A | 2/2020 |
| CN | 110786731 A | 2/2020 |
| CN | 110786732 A | 2/2020 |
| CN | 110786733 A | 2/2020 |
| CN | 110786749 A | 2/2020 |
| CN | 110801144 A | 2/2020 |
| CN | 110801145 A | 2/2020 |
| CN | 110801148 A | 2/2020 |
| CN | 110801149 A | 2/2020 |
| CN | 110801150 A | 2/2020 |
| CN | 110811282 A | 2/2020 |
| CN | 110811294 A | 2/2020 |
| CN | 110811295 A | 2/2020 |
| CN | 110811313 A | 2/2020 |
| CN | 110811315 A | 2/2020 |
| CN | 110811316 A | 2/2020 |
| CN | 110811318 A | 2/2020 |
| CN | 110811343 A | 2/2020 |
| CN | 110833316 A | 2/2020 |
| CN | 110840216 A | 2/2020 |
| CN | 110840237 A | 2/2020 |
| CN | 110840238 A | 2/2020 |
| CN | 110840239 A | 2/2020 |
| CN | 110840240 A | 2/2020 |
| CN | 110840241 A | 2/2020 |
| CN | 110840242 A | 2/2020 |
| CN | 110840243 A | 2/2020 |
| CN | 110840245 A | 2/2020 |

(56) References Cited

FOREIGN PATENT DOCUMENTS

| | | | |
|---|---|---|---|
| CN | 110840269 A | 2/2020 |
| CN | 110868894 A | 3/2020 |
| CN | 110876559 A | 3/2020 |
| CN | 110876567 A | 3/2020 |
| CN | 210124638 U | 3/2020 |
| CN | 210169803 U | 3/2020 |
| CN | 210185391 U | 3/2020 |
| CN | 110960112 A | 4/2020 |
| CN | 111000430 A | 4/2020 |
| CN | 111012203 A | 4/2020 |
| CN | 111053458 A | 4/2020 |
| CN | 210227842 U | 4/2020 |
| CN | 210227855 U | 4/2020 |
| CN | 210276928 U | 4/2020 |
| CN | 210300635 U | 4/2020 |
| CN | 210300732 U | 4/2020 |
| CN | 210300733 U | 4/2020 |
| CN | 210383667 U | 4/2020 |
| CN | 210408053 U | 4/2020 |
| CN | 210408158 U | 4/2020 |
| CN | 111184453 A | 5/2020 |
| CN | 210433346 U | 5/2020 |
| CN | 210493785 U | 5/2020 |
| CN | 210493795 U | 5/2020 |
| CN | 210540823 U | 5/2020 |
| CN | 210540971 U | 5/2020 |
| CN | 210540972 U | 5/2020 |
| CN | 210540973 U | 5/2020 |
| CN | 210540974 U | 5/2020 |
| CN | 210540981 U | 5/2020 |
| CN | 210582243 U | 5/2020 |
| CN | 111214101 A | 6/2020 |
| CN | 111214102 A | 6/2020 |
| CN | 111214131 A | 6/2020 |
| CN | 111227668 A | 6/2020 |
| CN | 111227671 A | 6/2020 |
| CN | 111248768 A | 6/2020 |
| CN | 111248771 A | 6/2020 |
| CN | 111297215 A | 6/2020 |
| CN | 111317357 A | 6/2020 |
| CN | 210673100 U | 6/2020 |
| CN | 210697273 U | 6/2020 |
| CN | 210697274 U | 6/2020 |
| CN | 210727514 U | 6/2020 |
| CN | 210810486 U | 6/2020 |
| CN | 210810617 U | 6/2020 |
| CN | 210871141 U | 6/2020 |
| CN | 111358308 A | 7/2020 |
| CN | 111374527 A | 7/2020 |
| CN | 111381503 A | 7/2020 |
| CN | 111387837 A | 7/2020 |
| CN | 111387840 A | 7/2020 |
| CN | 111449536 A | 7/2020 |
| CN | 210961428 U | 7/2020 |
| CN | 210961465 U | 7/2020 |
| CN | 210961472 U | 7/2020 |
| CN | 210961552 U | 7/2020 |
| CN | 210961553 U | 7/2020 |
| CN | 210989805 U | 7/2020 |
| CN | 111543865 A | 8/2020 |
| CN | 211186926 U | 8/2020 |
| CN | 211212725 U | 8/2020 |
| CN | 211212750 U | 8/2020 |
| CN | 211242957 U | 8/2020 |
| CN | 211242962 U | 8/2020 |
| CN | 211269978 U | 8/2020 |
| CN | 211270194 U | 8/2020 |
| CN | 211324483 U | 8/2020 |
| CN | 211432279 U | 9/2020 |
| CN | 211432426 U | 9/2020 |
| CN | 211432435 U | 9/2020 |
| CN | 211559722 U | 9/2020 |
| CN | 211559785 U | 9/2020 |
| CN | 211582730 U | 9/2020 |
| CN | 111772499 A | 10/2020 |
| CN | 211609338 U | 10/2020 |
| CN | 211609340 U | 10/2020 |
| CN | 211609354 U | 10/2020 |
| DE | 2705168 A1 | 8/1978 |
| DE | 2753827 A1 | 6/1979 |
| DE | 202011002302 U1 | 6/2011 |
| DE | 102011002821 A1 | 7/2012 |
| DE | 202017102536 U1 | 8/2018 |
| EP | 1767860 A1 | 3/2007 |
| EP | 2003400 A2 | 12/2008 |
| EP | 2020574 A2 | 2/2009 |
| EP | 2910856 A1 | 8/2015 |
| EP | 2976977 A1 | 1/2016 |
| EP | 3165134 A1 | 5/2017 |
| EP | 2904953 B1 | 12/2018 |
| EP | 3491980 A1 | 6/2019 |
| FR | 2409736 A1 | 6/1979 |
| GB | 2398628 A | 8/2004 |
| GB | 2479384 A | 10/2011 |
| JP | S5827524 A | 2/1983 |
| JP | H09164074 A | 6/1997 |
| JP | H1028643 A | 2/1998 |
| JP | 2005147604 A | 6/2005 |
| JP | 2007007027 A | 1/2007 |
| JP | 2008018122 A | 1/2008 |
| JP | 2009291417 A | 12/2009 |
| JP | 2011010786 A | 1/2011 |
| JP | 2013106850 A | 6/2013 |
| JP | 2014200627 A | 10/2014 |
| JP | 2014204770 A | 10/2014 |
| JP | 2015145778 A | 8/2015 |
| KR | 102109966 B1 | 5/2020 |
| WO | 8911773 A1 | 11/1989 |
| WO | 9837796 A1 | 9/1998 |
| WO | 9930086 A1 | 6/1999 |
| WO | 9952328 A1 | 10/1999 |
| WO | 0044096 A2 | 7/2000 |
| WO | 0049839 A1 | 8/2000 |
| WO | 2006122643 A1 | 11/2006 |
| WO | 2006132612 A1 | 12/2006 |
| WO | 2009043812 A1 | 4/2009 |
| WO | 2012051508 A2 | 4/2012 |
| WO | 2015006891 A1 | 1/2015 |
| WO | 2015028940 A1 | 3/2015 |
| WO | 2015062197 A1 | 5/2015 |
| WO | 2015081549 A1 | 6/2015 |
| WO | 2016007002 A1 | 1/2016 |
| WO | 2016012908 A1 | 1/2016 |
| WO | 2016028549 A1 | 2/2016 |
| WO | 2016091063 A1 | 6/2016 |
| WO | 2016141009 A1 | 9/2016 |
| WO | 2016148492 A1 | 9/2016 |
| WO | 2016154114 A1 | 9/2016 |
| WO | 2016165198 A1 | 10/2016 |
| WO | 2016171385 A1 | 10/2016 |
| WO | 2016182975 A1 | 11/2016 |
| WO | 2016189440 A1 | 12/2016 |
| WO | 2016193008 A1 | 12/2016 |
| WO | 2016193643 A1 | 12/2016 |
| WO | 2016199086 A1 | 12/2016 |
| WO | 2017005533 A1 | 1/2017 |
| WO | 2017039091 A1 | 3/2017 |
| WO | 2017045387 A1 | 3/2017 |
| WO | 2017049635 A1 | 3/2017 |
| WO | 2017049717 A1 | 3/2017 |
| WO | 2017050693 A2 | 3/2017 |
| WO | 2017063872 A1 | 4/2017 |
| WO | 2017072068 A1 | 5/2017 |
| WO | 2017074119 A1 | 5/2017 |
| WO | 2017076797 A1 | 5/2017 |
| WO | 2017081420 A1 | 5/2017 |
| WO | 2017085026 A1 | 5/2017 |
| WO | 2017085671 A1 | 5/2017 |
| WO | 2017085673 A1 | 5/2017 |
| WO | 2017086543 A1 | 5/2017 |
| WO | 2017092062 A1 | 6/2017 |
| WO | 2017092063 A1 | 6/2017 |
| WO | 2017094968 A1 | 6/2017 |
| WO | 2017097790 A1 | 6/2017 |

(56) References Cited

FOREIGN PATENT DOCUMENTS

| | | |
|---|---|---|
| WO | 2017104892 A1 | 6/2017 |
| WO | 2017104893 A1 | 6/2017 |
| WO | 2017104894 A1 | 6/2017 |
| WO | 2017104895 A1 | 6/2017 |
| WO | 2017104896 A1 | 6/2017 |
| WO | 2017104898 A1 | 6/2017 |
| WO | 2017104900 A1 | 6/2017 |
| WO | 2017105076 A2 | 6/2017 |
| WO | 2017111425 A1 | 6/2017 |
| WO | 2017121691 A1 | 7/2017 |
| WO | 2017127655 A1 | 7/2017 |
| WO | 2017144795 A1 | 8/2017 |
| WO | 2017149519 A1 | 9/2017 |
| WO | 2017152518 A1 | 9/2017 |
| WO | 2017153360 A1 | 9/2017 |
| WO | 2017158068 A1 | 9/2017 |
| WO | 2017166317 A1 | 10/2017 |
| WO | 2017177007 A1 | 10/2017 |
| WO | 2017177423 A1 | 10/2017 |
| WO | 2017178229 A1 | 10/2017 |
| WO | 2017178650 A1 | 10/2017 |
| WO | 2017178739 A1 | 10/2017 |
| WO | 2017179804 A1 | 10/2017 |
| WO | 2017191377 A1 | 11/2017 |
| WO | 2017191395 A1 | 11/2017 |
| WO | 2017195777 A1 | 11/2017 |
| WO | 2017197482 A1 | 11/2017 |
| WO | 2017198815 A1 | 11/2017 |
| WO | 2017198848 A1 | 11/2017 |
| WO | 2017201530 A1 | 11/2017 |
| WO | 2017202641 A1 | 11/2017 |
| WO | 2017209465 A1 | 12/2017 |
| WO | 2017211045 A1 | 12/2017 |
| WO | 2017213330 A2 | 12/2017 |
| WO | 2017213423 A1 | 12/2017 |
| WO | 2017215926 A1 | 12/2017 |
| WO | 2017215988 A1 | 12/2017 |
| WO | 2018004226 A1 | 1/2018 |
| WO | 2018007218 A1 | 1/2018 |
| WO | 2018014806 A1 | 1/2018 |
| WO | 2018015695 A1 | 1/2018 |
| WO | 2017077571 A1 | 2/2018 |
| WO | 2018018670 A1 | 2/2018 |
| WO | 2018023863 A1 | 2/2018 |
| WO | 2018024781 A1 | 2/2018 |
| WO | 2018024782 A1 | 2/2018 |
| WO | 2018024783 A1 | 2/2018 |
| WO | 2018026041 A1 | 2/2018 |
| WO | 2018026906 A1 | 2/2018 |
| WO | 2018026928 A1 | 2/2018 |
| WO | 2018032540 A1 | 2/2018 |
| WO | 2018032541 A1 | 2/2018 |
| WO | 2018032542 A1 | 2/2018 |
| WO | 2018032589 A1 | 2/2018 |
| WO | 2018032648 A1 | 2/2018 |
| WO | 2018037177 A1 | 3/2018 |
| WO | 2018040250 A1 | 3/2018 |
| WO | 2018041536 A1 | 3/2018 |
| WO | 2018045643 A1 | 3/2018 |
| WO | 2018050520 A1 | 3/2018 |
| WO | 2018050838 A1 | 3/2018 |
| WO | 2018058384 A1 | 4/2018 |
| WO | 2018058569 A1 | 4/2018 |
| WO | 2018058740 A1 | 4/2018 |
| WO | 2018059994 A1 | 4/2018 |
| WO | 2018060260 A1 | 4/2018 |
| WO | 2018060273 A1 | 4/2018 |
| WO | 2018060331 A1 | 4/2018 |
| WO | 2018065424 A1 | 4/2018 |
| WO | 2018068376 A1 | 4/2018 |
| WO | 2018068425 A1 | 4/2018 |
| WO | 2018068976 A1 | 4/2018 |
| WO | 2018076164 A1 | 5/2018 |
| WO | 2018076166 A1 | 5/2018 |
| WO | 2018076415 A1 | 5/2018 |
| WO | 2018082131 A1 | 5/2018 |
| WO | 2018090287 A1 | 5/2018 |
| WO | 2018093004 A1 | 5/2018 |
| WO | 2018095247 A1 | 5/2018 |
| WO | 2018095420 A1 | 5/2018 |
| WO | 2018095949 A1 | 5/2018 |
| WO | 2018099233 A1 | 6/2018 |
| WO | 2018102128 A1 | 6/2018 |
| WO | 2018104351 A1 | 6/2018 |
| WO | 2018107522 A1 | 6/2018 |
| WO | 2018107973 A1 | 6/2018 |
| WO | 2018116056 A1 | 6/2018 |
| WO | 2018116057 A1 | 6/2018 |
| WO | 2018120561 A1 | 7/2018 |
| WO | 2018121166 A1 | 7/2018 |
| WO | 2018121199 A1 | 7/2018 |
| WO | 2018122652 A1 | 7/2018 |
| WO | 2018133993 A1 | 7/2018 |
| WO | 2018137832 A1 | 8/2018 |
| WO | 2018138078 A1 | 8/2018 |
| WO | 2018140954 A1 | 8/2018 |
| WO | 2018142088 A1 | 8/2018 |
| WO | 2018146872 A1 | 8/2018 |
| WO | 2018147640 A1 | 8/2018 |
| WO | 2018157409 A1 | 9/2018 |
| WO | 2018161497 A1 | 9/2018 |
| WO | 2018165698 A1 | 9/2018 |
| WO | 2018171250 A1 | 9/2018 |
| WO | 2018189921 A1 | 10/2018 |
| WO | 2018191960 A1 | 10/2018 |
| WO | 2018197720 A1 | 11/2018 |
| WO | 2018207221 A1 | 11/2018 |
| WO | 2018212473 A1 | 11/2018 |
| WO | 2018216042 A1 | 11/2018 |
| WO | 2018220659 A1 | 12/2018 |
| WO | 2018223713 A1 | 12/2018 |
| WO | 2018227851 A1 | 12/2018 |
| WO | 2018227852 A1 | 12/2018 |
| WO | 2018227866 A1 | 12/2018 |
| WO | 2018227938 A1 | 12/2018 |
| WO | 2018233210 A1 | 12/2018 |
| WO | 2018235095 A1 | 12/2018 |
| WO | 2019015425 A1 | 1/2019 |
| WO | 2019026018 A1 | 2/2019 |
| WO | 2019032876 A1 | 2/2019 |
| WO | 2019032878 A1 | 2/2019 |
| WO | 2019061758 A1 | 4/2019 |
| WO | 2019064319 A1 | 4/2019 |
| WO | 2019066747 A2 | 4/2019 |
| WO | 2019071975 A1 | 4/2019 |
| WO | 2019080672 A1 | 5/2019 |
| WO | 2019081824 A1 | 5/2019 |
| WO | 2019081825 A1 | 5/2019 |
| WO | 2019082210 A1 | 5/2019 |
| WO | 2019085602 A1 | 5/2019 |
| WO | 2019086393 A1 | 5/2019 |
| WO | 2019091169 A1 | 5/2019 |
| WO | 2019097545 A1 | 5/2019 |
| WO | 2019104818 A1 | 6/2019 |
| WO | 2019110340 A1 | 6/2019 |
| WO | 2019111179 A1 | 6/2019 |
| WO | 2019114890 A1 | 6/2019 |
| WO | 2019128111 A1 | 7/2019 |
| WO | 2019129598 A1 | 7/2019 |
| WO | 2019130011 A1 | 7/2019 |
| WO | 2019132150 A1 | 7/2019 |
| WO | 2019136785 A1 | 7/2019 |
| WO | 2019141207 A1 | 7/2019 |
| WO | 2019141321 A1 | 7/2019 |
| WO | 2019149573 A1 | 8/2019 |
| WO | 2019153512 A1 | 8/2019 |
| WO | 2019153807 A1 | 8/2019 |
| WO | 2019183755 A1 | 10/2019 |
| WO | 2019184188 A1 | 10/2019 |
| WO | 2019185321 A1 | 10/2019 |
| WO | 2019201084 A1 | 10/2019 |
| WO | 2019207325 A1 | 10/2019 |
| WO | 2019219018 A1 | 11/2019 |
| WO | 2019227766 A1 | 12/2019 |

(56) References Cited

FOREIGN PATENT DOCUMENTS

| | | |
|---|---|---|
| WO | 2019227843 A1 | 12/2019 |
| WO | 2019229763 A1 | 12/2019 |
| WO | 2019233018 A1 | 12/2019 |
| WO | 2019237478 A1 | 12/2019 |
| WO | 2019237483 A1 | 12/2019 |
| WO | 2019237631 A1 | 12/2019 |
| WO | 2019238605 A1 | 12/2019 |
| WO | 2019238794 A1 | 12/2019 |
| WO | 2019243093 A1 | 12/2019 |
| WO | 2019243922 A1 | 12/2019 |
| WO | 2020000046 A1 | 1/2020 |
| WO | 2020002064 A1 | 1/2020 |
| WO | 2020010513 A1 | 1/2020 |
| WO | 2020016084 A1 | 1/2020 |
| WO | 2020016085 A1 | 1/2020 |
| WO | 2020029519 A1 | 2/2020 |
| WO | 2020029520 A1 | 2/2020 |
| WO | 2020029695 A1 | 2/2020 |
| WO | 2020030462 A1 | 2/2020 |
| WO | 2020034764 A1 | 2/2020 |
| WO | 2020034798 A1 | 2/2020 |
| WO | 2020037914 A1 | 2/2020 |
| WO | 2020038209 A1 | 2/2020 |
| WO | 2020042466 A1 | 3/2020 |
| WO | 2020052010 A1 | 3/2020 |
| WO | 2020062650 A1 | 4/2020 |
| WO | 2020062651 A1 | 4/2020 |
| WO | 2020070198 A1 | 4/2020 |
| WO | 2020071590 A1 | 4/2020 |
| WO | 2020073522 A1 | 4/2020 |
| WO | 2020074178 A1 | 4/2020 |
| WO | 2020074476 A1 | 4/2020 |
| WO | 2020078010 A1 | 4/2020 |
| WO | 2020078403 A1 | 4/2020 |
| WO | 2020078836 A1 | 4/2020 |
| WO | 2020080738 A1 | 4/2020 |
| WO | 2020082329 A1 | 4/2020 |
| WO | 2020082854 A1 | 4/2020 |
| WO | 2020087714 A1 | 5/2020 |
| WO | 2020091531 A1 | 5/2020 |
| WO | 2020093417 A1 | 5/2020 |
| WO | 2020094293 A1 | 5/2020 |
| WO | 2020098748 A1 | 5/2020 |
| WO | 2020098749 A1 | 5/2020 |
| WO | 2020099339 A1 | 5/2020 |
| WO | 2020099355 A1 | 5/2020 |
| WO | 2020108375 A1 | 6/2020 |
| WO | 2020108917 A1 | 6/2020 |
| WO | 2020127334 A1 | 6/2020 |
| WO | 2020134318 A1 | 7/2020 |
| WO | 2020148164 A1 | 7/2020 |
| WO | 2020148187 A1 | 7/2020 |
| WO | 2020163711 A1 | 8/2020 |
| WO | 2020177323 A1 | 9/2020 |
| WO | 2020184785 A1 | 9/2020 |

OTHER PUBLICATIONS

Civil Action No. 19-cv-24114, U.S. District Court, Southern District of Florida; Defendant 5 Emeril Lagasse's Motion to Dismiss for Improper Venue; *SharkNinja OPerating LLC*(Plaintiff) v. *Tristar Products, Inc. and Emeril Lagasse*(Defendants); Document 24, entered on Nov. 24, 2019, pp. 1-6.

Civil Action No. 19-cv-24114, U.S. District Court, Southern District of Florida; Defendant Tristar Products Inc.'S Answer To Plaintiff's Complaint and Counterclaims; SharkNinja 6 ::*Operating LLC*(Plaintiff) v *Emeril Lagasse*(Defendant) *and Tristar Product, SharkNinja*; *Operating LLC*(Plaintiff) v *Emeril Lagasse*(Defandant) and *Tristar Products, Inc.* (Defandant/Counterclaim Plaintiff) v *SharkNinja Operating LLC, Daniel R. Gibson, Cantor Colburn LLP, Pedro Lopez-Baldrich*(Counterclaim Defendants); Document 25, entered on Nov. 29, 2019, pp. 1-36.

Civil Action No. 19-cv-24114, U.S. District Court, Southern District of Florida; Complaint; Plaintiff SharkNinja Operating LLC for Complaint for Patent Infringement and Demand for Jury Trial against Defendant~ Tristar Products, Inc. and Emeril Lagasse (entered on Oct. 4, 2019), pp. 1-194.

European Search Report Received for European Patent Application No. 1921797806-1004, mailed on Apr. 1, 2020, 7 pages.

European Search Report Received for European Patent Application No. 19218088.3-1004, mailed on Jun. 3, 2020, 7 pages.

European Search Report Received for European Patent Application No. 19218218.6-1004, mailed on May 27, 2020, 6 pages.

European Search Report Received for European Patent Application No. 19218240.0-1004, mailed on May 27, 2020, 7 pages.

European Search Report Received for European Patent Application No. 19218259.0-1004, mailed on May 27, 2020, 7 pages.

European Search Report Received for European Patent Application No. 19218129.5-1004, mailed on May 19, 2020, 7 pages.

European Search Report Received for European Patent Application No. 19218251.7-1004, mailed on May 27, 2020, 7 pages.

Hip Cooking, "Pressure Cooker PSI FAQ: The Stuff You Didn't Think to Ask about Pressure", [online]; [retrieved on Nov. 25, 2019]; retrieved from the Internethttps://www.hippressurecooking.com/pressure-cooker-psi-faq-the-stuff-you-didnt-think-to-ask/ Laura Pazzaglia, Hip Cooking, Apr. 7, 2013, pp. 1-26.

International Preliminary Report on Patentability Received for PCT Application No. PCT/US2018/046079, mailed on Feb. 20, 2020, 11 pages.

International Preliminary Report on Patentability Received for PCT Application No. PCT/US2018/046077, mailed on Feb. 20, 2020, 12 pages.

International Search Report and Written Opinion Received for PCT Application No. PCT/US2020/017203, mailed on Jun. 4, 2020, 12 pages.

International Search Report and Written Opinion Received for PCT Application No. PCT/US2018/046079, mailed on Jan. 2, 2019, 7 pages.

International Search Report and Written Opinion Received for PCT Application No. PCT/US2018/046077, mailed on Dec. 19, 2018, 17 pages.

International Search Report and Written Opinion Received for PCT Application No. PCT/US2020/017205, mailed on Jul. 16, 2020, 15 pages.

International Search Report and Written Opinion Received for PCT Application No. PCT/US2020/019685, mailed on Dec. 8, 2020, 20 pages.

International Search Report Received for PCT Application No. PCT/US2019/065662, mailed on Mar. 25, 2020, 7 pages.

International Search Report Received for PCT Application No. PCT/US2020/019664, mailed on Jun. 4, 2020, 6 pages.

Invitation to Pay Additional Fees Received for PCT Application No. PCT/US2020/017205, mailed on May 19, 2020, 61 pages.

Invitation to Pay Additional Fees Received for PCT Application No. PCT/US2020/019685, mailed on Oct. 13, 2020, 11 pages.

Delonghi, "FH1163 FH1363 MultiFry, DeLonghi Instruction Manual", www.delonghi.com, 5712511041/05.15, retrieved from the internet https://www.delonghl.com/en-us/products/kitchen/k/tchen-appfiancesllow-oil-fryer-end-multicooker/multlfry-fh1163lbk-0125392006?TabSegment•support#supportDeLonghi, Mar. 18, 2019, pp. 1-11.

U.S. Appl. No. 16/800,476, filed Feb. 25, 2020, Guard for Cooking System.

* cited by examiner

GUARD FOR COOKING SYSTEM

CROSS-REFERENCE TO RELATED APPLICATIONS

This application is a divisional of U.S. application Ser. No. 16/800,476, filed on Feb. 25, 2020 and entitled "GUARD FOR COOKING SYSTEM," which claims priority to U.S. Provisional Application Ser. No. 62/810,254, filed Feb. 25, 2019, the entire contents of which are incorporated herein by reference.

BACKGROUND

Embodiments of the present disclosure relate generally to a cooking system, and more particularly, to a guard for blocking a flow of fat or oil from contacting a heating element of a cooking system.

SUMMARY

According to an embodiment, a cooking system including a housing having a hollow interior, a heating element associated with said housing, a support body for supporting the food within said hollow interior such that the food is positionable on a support surface of said support body, and a guard located between at least a portion of the support surface and said heating element. The guard is permissive of convective airflow between said hollow interior and said heating element, and is generally impermeable to projectile matter generated during a cooking operation.

According to yet another embodiment, a cooking system includes a housing having a hollow interior, a first heating element associated with said housing and operable in a first cooking mode, a second heating element associated with said housing and operable in a second cooking mode, and a guard configurable with said housing to be permissive of convective airflow between said hollow interior and said heating element during said first cooking mode, and non-permissive of convective airflow between said hollow interior and said heating element during said second cooking mode.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
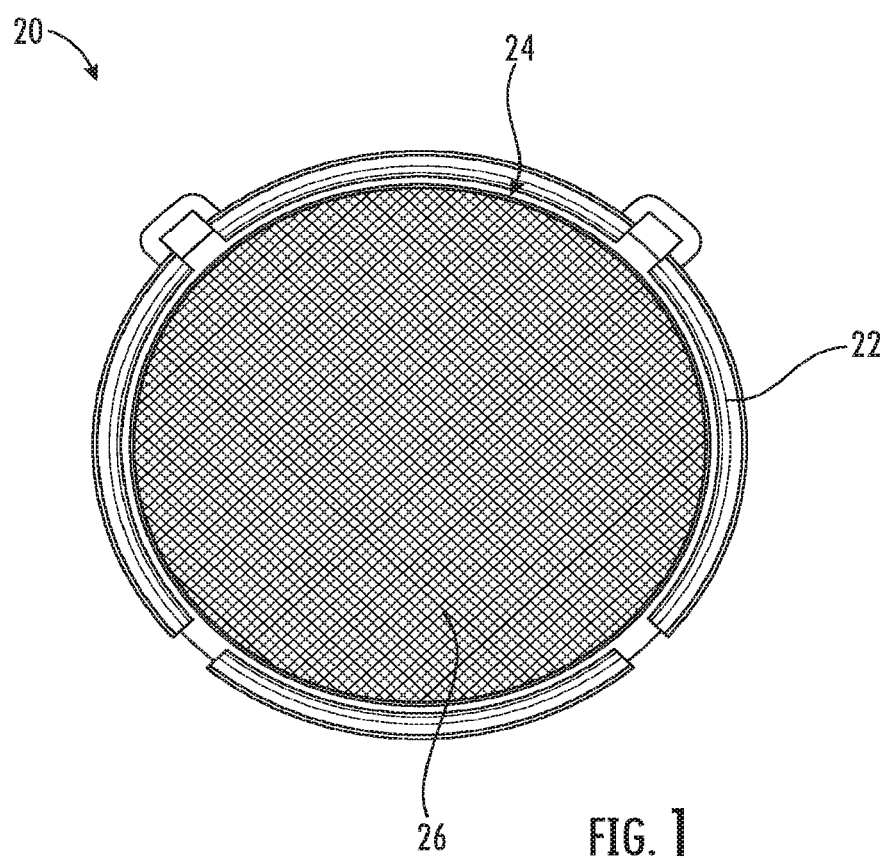
FIG. 1 is a plan view of a guard for use with a cooking system according to an embodiment.
Figure 2:
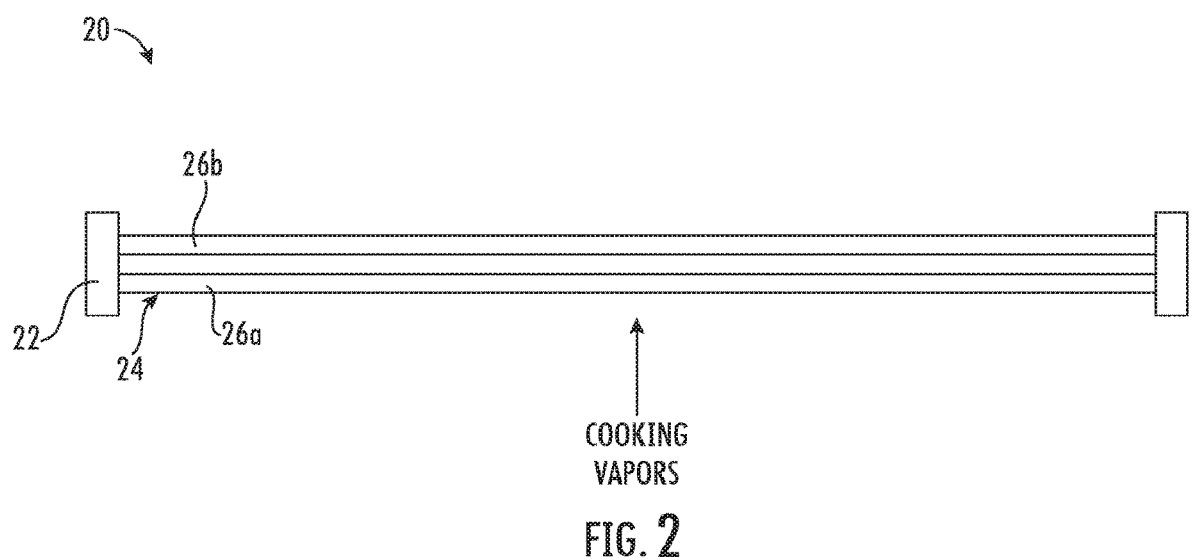
FIG. 2 is a schematic view of the guard of FIG. 1 according to an embodiment.

With reference now to FIGS. 1 and 2, an example of a guard 20 for use during a cooking operation is illustrated. As shown, the guard 20 includes a frame 22 and a body 24 formed from at least one layer of material 26 mounted within the frame 22. In the illustrated, non-limiting embodiment, the body 24 includes a first layer 26a and a second layer 26b (FIG. 2). However, it should be understood that a guard 20 having a body 24 including only single layer of material, or alternatively, more than two layers of material are also within the scope of the disclosure.

The at least one layer 26 of the body 24 is permeable to air and water vapor. The layer 26 may be selected from any suitable heat-resistant material. In an embodiment, the material used to form one or more of the layers 26 of the body 24 is a non-absorbent material, such as a metal wire mesh for example. The configuration of the mesh, such as the size of the apertures of the mesh for example, is selected such that projectile matter generated during a cooking operation, such as fat or oil for example, is substantially blocked from passage through the apertures. However, the sizes of the apertures may also be selected to allow a flow of air and heat, sufficient for performing a convective cooking operation for example, to pass through the material. In an embodiment using two layers, the mesh material of each layer 26a and 26b may be formed from a braided or welded metal wire having a diameter of 0.4 mm to 0.5 mm, with openings of 0.8 mm to 2.1 mm. More specifically, each layer 26a and 26b may be formed from a braided or welded metal wire having a diameter of about 0.45 mm, with openings of about 1.5 mm. The layers 26a and 26b may be aligned such that the openings between the overlapping layers are 0.4 mm to 2.1 mm, and more specifically 0.4 mm to 1.5 mm, 0.4 mm to 0.75 mm, and 0.75 mm to 1.5 mm.

Heat-resistant, non-absorbent materials that are non-metallic, such as silicone for example, are also within the scope of the disclosure. In such embodiments, the layer 26 may similarly have a plurality of openings or apertures formed therein. Further, any material that is capable of being chemically treated to achieve desired heat-resistant and non-absorbent properties is also within the scope of the disclosure.

Alternatively, in addition to being vapor-permeable, the material of one or more of the layers of the body may be liquid or grease-absorbent. Examples of such materials, includes, but are not limited to, a vapor-permeable cloth, such as a textile cloth, or a cellulose cloth. The various types of materials illustrated and described herein are intended as an example only, and it should be understood that any material suitable to block a flow of projectile matter is contemplated herein.

With reference to FIG. 2, in embodiments where the body 24 of the guard 20 includes multiple layers, the plurality of layers of material 26 are stacked along a flow path of cooking vapors generated during a cooking operation. Although the first and second layers 26a, 26b are shown as being spaced from one another along the flow path, embodiments where adjacent layers are arranged in direct contact with one another are also contemplated herein.

Each of the layers 26 of the body 24 may be formed from a similar material or a different material. In addition, the layers 26 may have similar or different configurations and/or orientations. For example, a gauge of a first layer 26a of mesh may be different than the gauge of a second layer 26b of mesh. Further, the first and second layers 26a, 26b may be arranged such that apertures of the first layer 26a are generally aligned with the apertures of the second layer 26b. Alternatively, the material of the second layer 26b may be shifted or rotated relative to the material of the first layer 26a such that the apertures of the first layer 26a are staggered or offset from the apertures of the second layer 26b. In such embodiments, the apertures of the first layer 26a and the apertures of the second layer 26b cooperate to define an open area of the body 24 through which a fluid, such as air or vapor, may pass.

A configuration of the body 24 may be adjustable to control the permeability of the body 24, for example based on the cooking operation being performed. In an embodiment, a configuration of one or more layers 26 may be adjustable to achieve any configuration of the body 24 between a fully open configuration and a fully closed configuration. In the fully open configuration, the body 24 may be permeable not only to cooking vapors and air flow, but also projectile material, and in the fully closed configuration, the body 24 may be impermeable to all flows including projectile matter, cooking vapors, air, and heat. In an embodiment, a position of one or more layers 26 of the body 24 is adjustable to control the permeability of the body 24. For example, one or more of the layers 26 may be rotatable relative to another of the layers 26 of the body 24 to selectively increase or decrease the open area of the body 24 through which cooking vapors may flow. In embodiments including two or more layers 26 with openings or apertures, at least one of the layers 26 is movable to align the openings of adjacent layers, thereby increasing the open area of the body 24. Similarly, one or more of the layers 26 is movable to stagger or offset the openings of adjacent layers 26, thereby reducing the permeable area of body 24.

Alternatively, or in addition, one or more layers 26 of the body 24 may be selectively removable to adjust the permeability of the body 24. For example, elimination of one of a plurality of layers 26 of the body 24 may increase the open area through which cooking vapors may flow. Similarly, one or more layers 26 may be added to the body 24 to further reduce the open area of the body 24, thereby restricting a flow there through.

Figure 3:
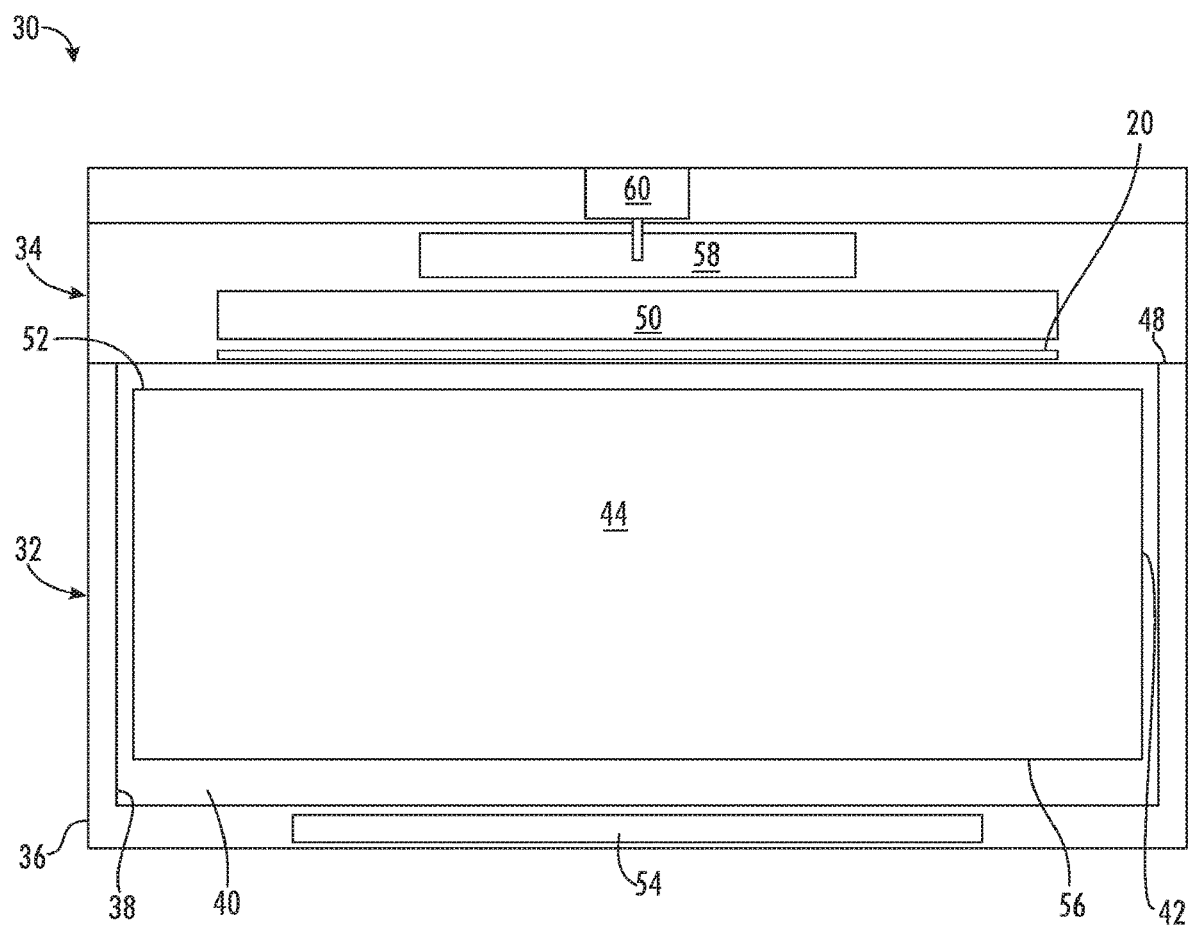
FIG. 3 is a schematic diagram of a cooking system including a guard according to an embodiment.

In an embodiment, the guard 20 is suitable for use within a countertop cooking system 30. An example of a cooking system 30 is illustrated in more detail in FIG. 3. As shown, the cooking system 30 includes a base 32 and a lid 34. The base 32 includes a housing 36 made of any suitable material, such as glass, aluminum, plastic, or stainless steel for example. A liner 38 may be disposed within the hollow interior 40 of the housing 36. The liner 38 may be formed from any suitable conductive material, such as aluminum for example. In an embodiment, the liner 38 forms an interior surface of the housing 36 and thereby defines the hollow interior 40 of the housing 36. Alternatively, the liner 38 may be offset from the interior surface of the housing 36. However, it should be understood that other components of the cooking system 30, or surfaces thereof, may also define the hollow interior 40.

A cooking container 42 is receivable within the hollow interior 40 of the housing 36. Although the cooking container 42 is described herein as being removable from the housing 36 of the base 32, embodiments where the cooking container 42 is integrally formed with the housing 36 are also contemplated herein. The cooking container 42, has an interior 44 designed to receive and retain one or more consumable products, such as food products for example, therein. Examples of food products suitable for use with the cooking system 30, include but are not limited to, meats, fish, poultry, bread, rice, grains, pasta, vegetables, fruits, and dairy products, among others. The cooking container 42 may be a pot formed from a ceramic, metal, or die cast aluminum material. In an embodiment, an interior surface of the cooking container 42 includes a nano-ceramic coating and an exterior surface of the cooking container 42 includes a silicone epoxy material. However, any suitable material capable of withstanding the high temperatures required for cooking food products is contemplated herein. Further, one or more handles 46 may be associated with the cooking container 42 to allow a user to easily grasp and manipulate the cooking container 42 relative to the housing 36.

One or more accessories, may be compatible for use with the cooking system 30. Examples of such accessories include, but are not limited to, a diffuser, a crisping insert, a grill plate, and a griddle for example. In such embodiments, the accessories may be receivable within the interior 40 of the housing 36, or alternatively, within the interior 44 of the cooking container 42.

Referring with more detail to the lid 34, it should be noted that the lid 34 is connectable to a surface of the cooking container 42 and/or housing 36 to close off entry to the interior 44 of the cooking container 42. Accordingly, a cooking volume may be defined between the interior 43 of the cooking container 42 and the closed lid 34, or alternatively, between the hollow interior 40 defined by the housing 36 and the closed lid 34. In an embodiment, a diameter of the lid 34 is generally complementary to a diameter of the housing 36 such that the lid 34 covers not only the cooking container 42, but also an upper surface 48 of the housing 36.

The lid 34 is movable relative to the base 32 between an open position and a closed position to selectively cover the hollow interior 40. For example, the lid 34 may be distinct and separable from the base 32, or the lid 34 may be movably connected to the base 32. In the illustrated, non-limiting embodiment, the lid 34 is pivotable or rotatable relative to the base 32 about a pivot axis P. However, other types or movement of the lid 34 are also within the scope of the disclosure. One or more fastening mechanisms (not shown) may, but need not be used to secure the lid 34 to the base 32 when the lid 34 is in the closed position. Any suitable type of fastening mechanism capable of withstanding the heat associated with the cooking system 30 is considered within the scope of the disclosure.

The cooking system 30 includes at least one heating element operable to impart heat to the cooking volume during one or more modes of operation of the cooking system 30. In the illustrated, non-limiting embodiment, a heating element 50 is positioned generally at or above an upper extent 52 of the cooking container 42, such as proximate a center of the interior 44 of the cooking container 42 for example. As shown, the at least one heating element 50 is mounted within the lid 34, and therefore completely outside of the cooking container 42, and vertically offset from the upper extent 52 thereof. Alternatively, or in addition, a heating element 54 may be disposed within the housing 36, generally adjacent the bottom 56 of the cooking container 42. However, it should be understood that embodiments where a heating element is arranged at another location within the base 32 and/or the lid 34 are also contemplated herein.

The at least one heating element 50, 54 may be capable of performing any suitable type of heat generation. For example, a heating element 50, 54 configured to heat the cooking container 42 or one or more food items located within the interior 44 of the cooking container 42 via conduction, convection, radiation, and induction are all within the scope of the disclosure. In the illustrated, non-limiting embodiment, the heating element 50 is operable to cook food within the cooking container 42 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 30 additionally includes an air movement device 58, such as a fan for example, operable to circulate air within the cooking volume. The air is heated as it flows along its path of circulation, such as by flowing over a portion of the at least one heating element 50. In the illustrated, non-limiting embodiment, the air movement device 58 is driven by a motor 60 having a separate cooling mechanism coupled thereto.

In an embodiment, the heating element 54 is operable to cook food within the cooking container 42 via a contact cooking operation. As used herein, the term "contact cooking operation" includes a cooking operation where heat is transmitted via direct or indirect contact between a heating element or heat source and a food item, such as, but not limited to, conductive and inductive cooking. However, it should be understood that embodiments where the heating element 50 is operable to perform a contact cooking operation and embodiments where the heating element 54 is operable to perform a non-contact cooking operation are also within the scope of the disclosure.

Further, in embodiments including heating element 50 and heating element 54, it should be understood that the heating elements may be operable independently or in combination to apply one or more predetermined power settings to cook the food products within the cooking container. In operation, the heating elements 50, 54 may be capable of cooking the food independent of the loading of the food. In other words, the heating elements 54 may be capable of cooking the food independent of the amount of food within the cooking container 42. The cooking operations that may be performed by the cooking system 30 include but are not limited to pressure cooking, steam cooking, slow cooking, searing, sautéing air frying, broiling, baking/roasting, dehydrating, and grilling.

Figure 4:
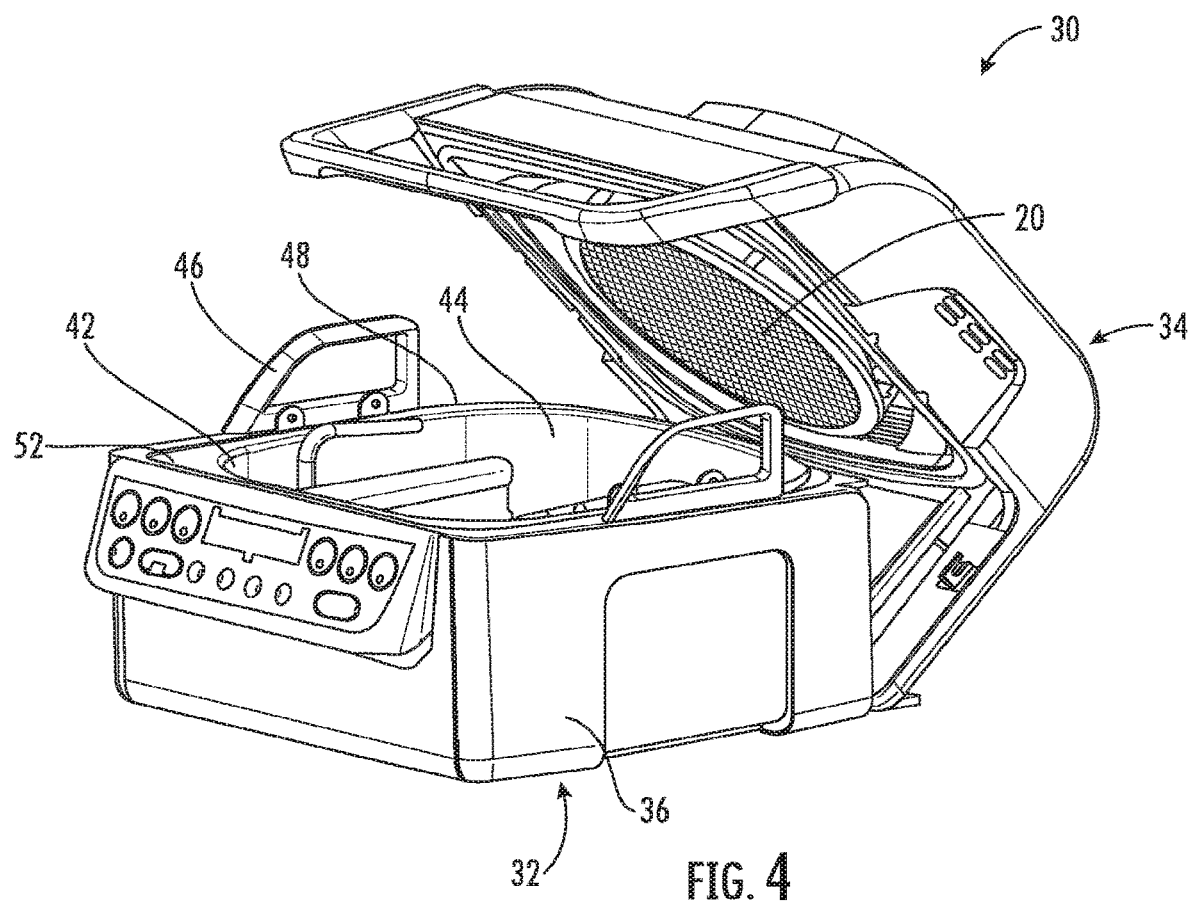
FIG. 4 is a front perspective view of a cooking system according to an embodiment.
Figure 5:
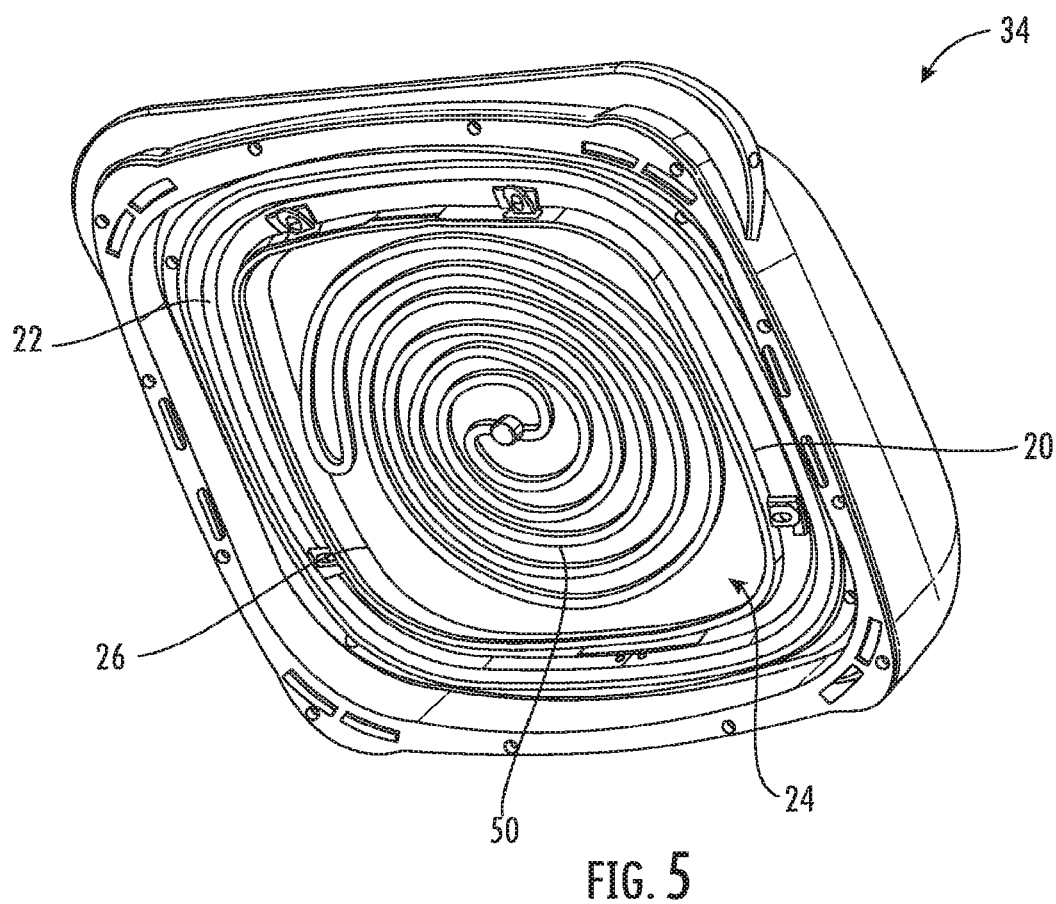
FIG. 5 is a perspective view of a lid of a cooking system according to an embodiment.

The guard 20 is mounted within the interior of the cooking system 30. The guard may be mounted via any suitable mounting mechanism, and may be removably or permanently arranged therein. As shown, the guard 20 may be located at any position between a food item being cooked within the cooking container 42 and a heating element 50, 54 of the cooking system 30. In the illustrated non-limiting embodiment, the guard is mounted within the lid 34 of the cooking system 30 adjacent heating element 50. As best shown in FIGS. 4 and 5, the body 24 of the guard 20 is sized such that body 24 substantially overlaps, and therefore protects, the entire surface of the heating element 50 facing the cooking volume. In an embodiment, a contour of the guard 20 is generally complementary to the shape of the heating element 50 that the guard is intended to protect. However, in other embodiments, best shown in FIG. 5, the contour of the guard 20 may be complementary to the lid 34.

As previously described, a permeability of the guard 20 may vary based on the cooking operation to be performed by the cooking system 30. In an embodiment, such as when the heating element 50 of the cooking system 30 is operational, the permeability of the guard 20 may be increased to allow air flow driven by the air movement device 58 to circulate through the guard 20. However, in such embodiments, the guard 20 is at least partially closed to restrict projectile matter generated during the cooking operation from contacting the heating element 50. By blocking at least a portion of the projectile matter generated during the cooking operation, smoke generation resulting from projectile matter contacting a hot heating element 50 is limited.

In embodiments where heating element 54 is operational, but heating element 50 is non-operational, it may be desirable to transform the guard to a fully closed position. For example, by closing off the heating element 50 (when non-operational) from communication with the interior 44 via the guard 20, the system can function in "wet" cooking modes (such as slow cooking, searing/sauteing, steaming, and pressure cooking) with lid 34 closed. If/when the guard 20 is impermeable to any fluid/air flow, the heater 50 is protected from projectiles and any steam that may travel up from the interior 44 during wet cooking modes. The guard 20 may then be transformed back into an open position (that still is generally impressible to grease and other projectiles but allows air/fluid flow from the interior 44 to the heating element 50) for "dry" cooking modes where fluid/air flow is beneficial (such as air frying, broiling, roasting/baking, dehydrating). As is discussed below, permeability adjustments (including full closing of heater 50 from the interior 44) may include adjustment of one, some, or all layers 26 and/or full removal and replacement of one, some, or all layers 26.

In an embodiment, the permeability of the guard 20 is adjusted prior to energizing any of the heating elements 50, 54 of the cooking system 30. Such adjustment may rotate or otherwise move one layer relative to another to block or otherwise decrease (via smaller size or non-linear pathway) the ability of particulate or in some cases fluid/air flow altogether from passing through the guard 20. In other embodiments, the guard 20 itself or layers 26 thereof may be removed from the cooking system 30 for some cooking operations and replaced for others (in some embodiments the guard 20 may be removed for dry modes and replaced for wet modes). In such embodiments, the guard 20 may simply be a plate without any openings that functions to removably cover the heating element 50 during the desired modes. Alternatively, the permeability of the guard 20 may be controlled during operation of the cooking system 30, automatically and in real time.

Figure 6:
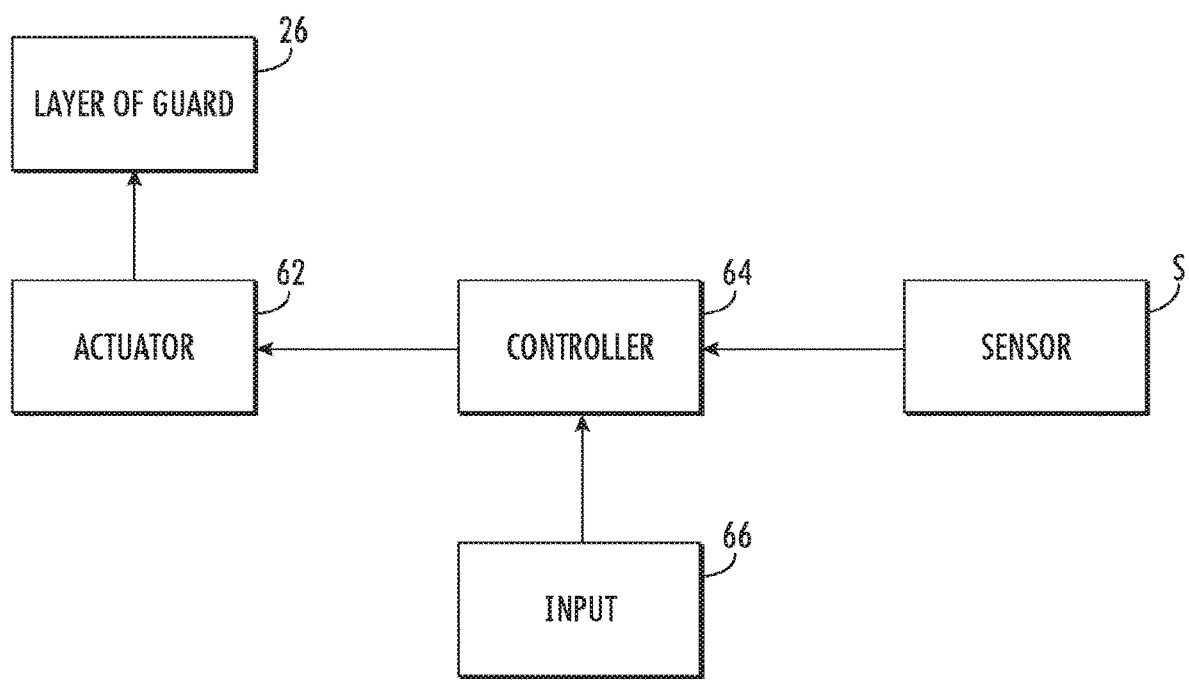
FIG. 6 is a schematic diagram of a control system associated with a guard of a cooking system according to an embodiment.

With reference now to FIG. 6, in an embodiment, one or more of the layers 26 of the body 24 is operably coupled to an actuator 62 or other movement mechanism. The cooking system 30 includes a controller 64 operably coupled to one or more inputs 66, such as buttons for example. The inputs 66 may be operable to select one of a plurality of modes of operation of the cooking system 30. In response to a mode of operation selected via an input 66, the controller 64 commands the actuator 62 to adjust of one or more of the layers 26 of the body 24 of the guard 20 to a desired configuration. Alternatively, or in addition, a sensor S for sensing one or more parameters within the cooking volume during a cooking operation may be operably coupled to the controller 64. In response to a condition detected within the cooking volume, such as reduced air flow for example, the controller 64 may command the actuator 62 to adjust a position of one or more of the layers 26 of the body 24.

The cooking system 30 having a guard 20 as illustrated and described herein has a reduced likelihood of smoking and grease splatter. As a result, the cooking system is easier for a user to operate and clean, thereby providing an enhanced user experience.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:
a housing having a hollow interior;
a first heating element associated with said housing and operable in a first cooking mode;
a second heating element associated with said housing and operable in a second cooking mode;
a guard, comprising:
a first layer having a first plurality of openings positioned therein; and
a second layer having a second plurality of openings positioned therein;
wherein, the guard is positioned within said housing in the first cooking mode and the second cooking mode, wherein in the first cooking mode the guard is permeable to allow convective airflow between said hollow interior and said heating element at a first flowrate, and in the second cooking mode the guard is permeable to allow convective airflow between said hollow interior and said heating element at a second flowrate, wherein the first flowrate is greater than the second flowrate.

2. The cooking system of claim 1, wherein in said first cooking mode said first heating element is operational and in said second cooking mode said first heating element is non-operational.

3. The cooking system of claim 1, wherein said guard is removably mounted within said cooking system.

4. The cooking system of claim 1, wherein said guard is adjustable between a fully open configuration and a fully closed configuration.

5. The cooking system of claim 1, wherein said cooking system further comprises a lid movable relative to said housing and said first heating element is disposed within said lid.

6. The cooking system of claim 5, wherein said guard is associated with said lid.

7. The cooking system of claim 1, wherein in the first cooking mode the second layer is rotated relative to the first layer such that the first plurality of holes aligns with the second plurality of holes.

8. The cooking system of claim 7, wherein in the second cooking mode the second layer is rotated relative to the first layer such that the first plurality of holes misaligns with the second plurality of holes.

9. A cooking system comprising:
a housing having a hollow interior;
a first heating element associated with said housing and operable in a first cooking mode;
a second heating element associated with said housing and operable in a second cooking mode;
a guard, comprising:
a first layer having a first plurality of openings positioned therein; and
a second layer having a second plurality of openings positioned therein, wherein the second layer is rotatable relative to the first layer;
wherein, the guard is positioned within said housing in the first cooking mode and the second cooking mode, wherein in the first cooking mode the second layer is rotated such that the first plurality of holes align with the second plurality of holes, and in the second cooking mode the second layer is rotated such that the first plurality of holes are misaligned with the second plurality of holes in order to reduce a flowrate through the guard in the second cooking mode compared to the first cooking mode.

* * * * *